United States Patent [19]

Regan et al.

[11] 4,140,882

[45] Feb. 20, 1979

[54] METHODS AND APPARATUS FOR SPECIAL STATUS INDICATION IN TELEPHONE SYSTEMS

[75] Inventors: John F. Regan, Lombard; Robert F. Wojcinski, Westmond; Richard S. Surma, Lombard; Ronald C. Fischer, Hanover Park, all of Ill.

[73] Assignee: Wescom Switching, Inc., Downers Grove, Ill.

[21] Appl. No.: 832,663

[22] Filed: Sep. 12, 1977

[51] Int. Cl.² .................... H04M 1/00; H04M 3/02
[52] U.S. Cl. .................... 179/84 L; 179/18 HB; 179/84 C
[58] Field of Search .......... 179/18 B, 18 HB, 27 FC, 179/81 C, 84 C, 84 L Primary Examiner—George G. Stellar
Attorney, Agent, or Firm—Leydig, Voit, Osann, Mayer & Holt, Ltd.

[57] ABSTRACT

A telephone system usable for example in hotels or the like and in which each of a plurality of telephone sets is equipped with a special status indicator or signal light as well as the usual bell, the system being characterized in that the indicator is automatically excited without ringing the bell by voltages applied from the ring generator whose output signal is connected across the tip and ring leads of a telephone line when the latter is placed in a special status (message waiting) by a status signal in the control unit. The ring generator is constructed to produce special status indicator excitation voltages during the "bell silent" intervals of its output signal, and the indicator is periodically actuated by connecting that output signal across the tip and ring leads of telephone sets, which are in the special status, during at least a portion of such intervals.

34 Claims, 17 Drawing Figures

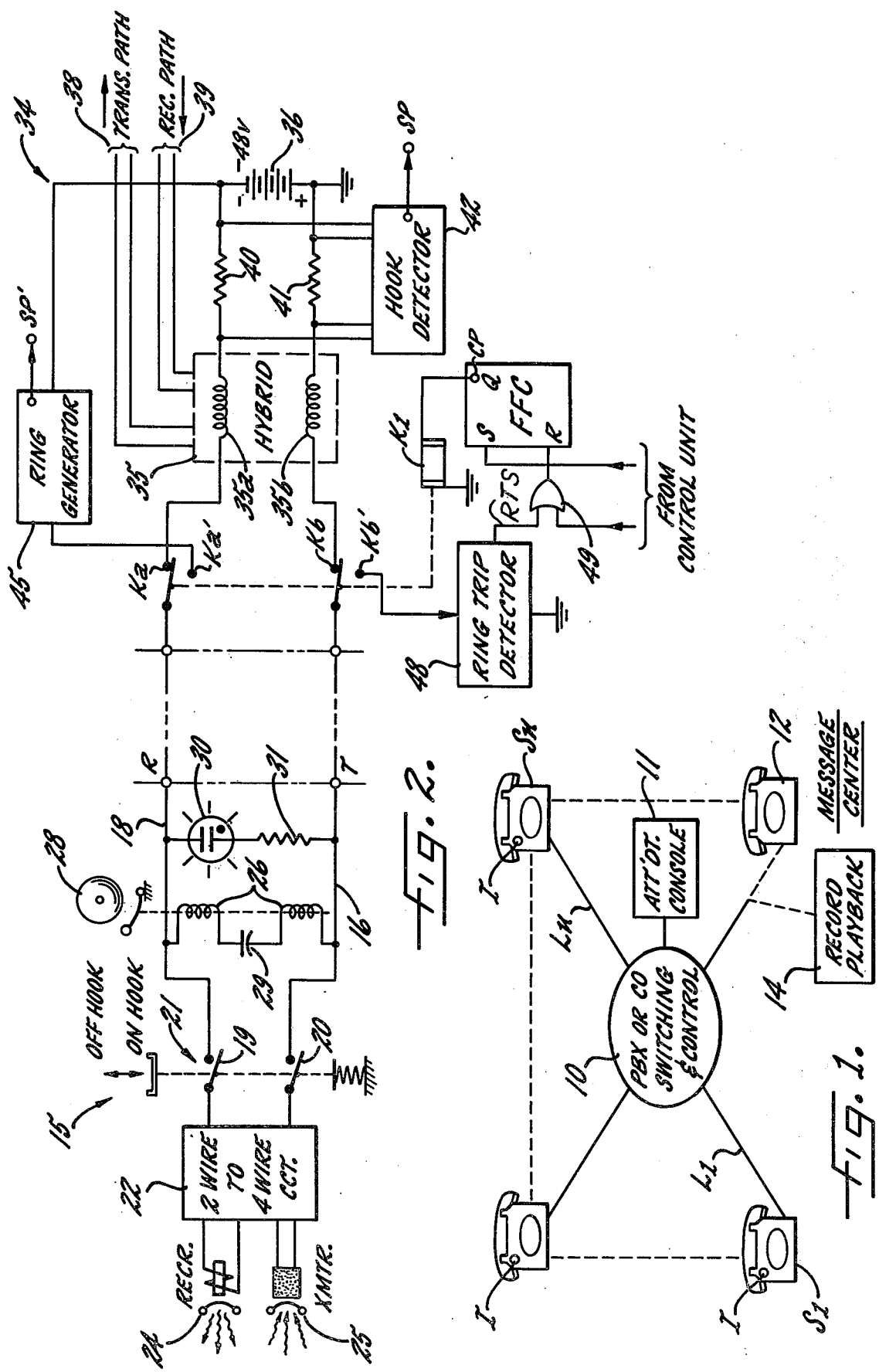

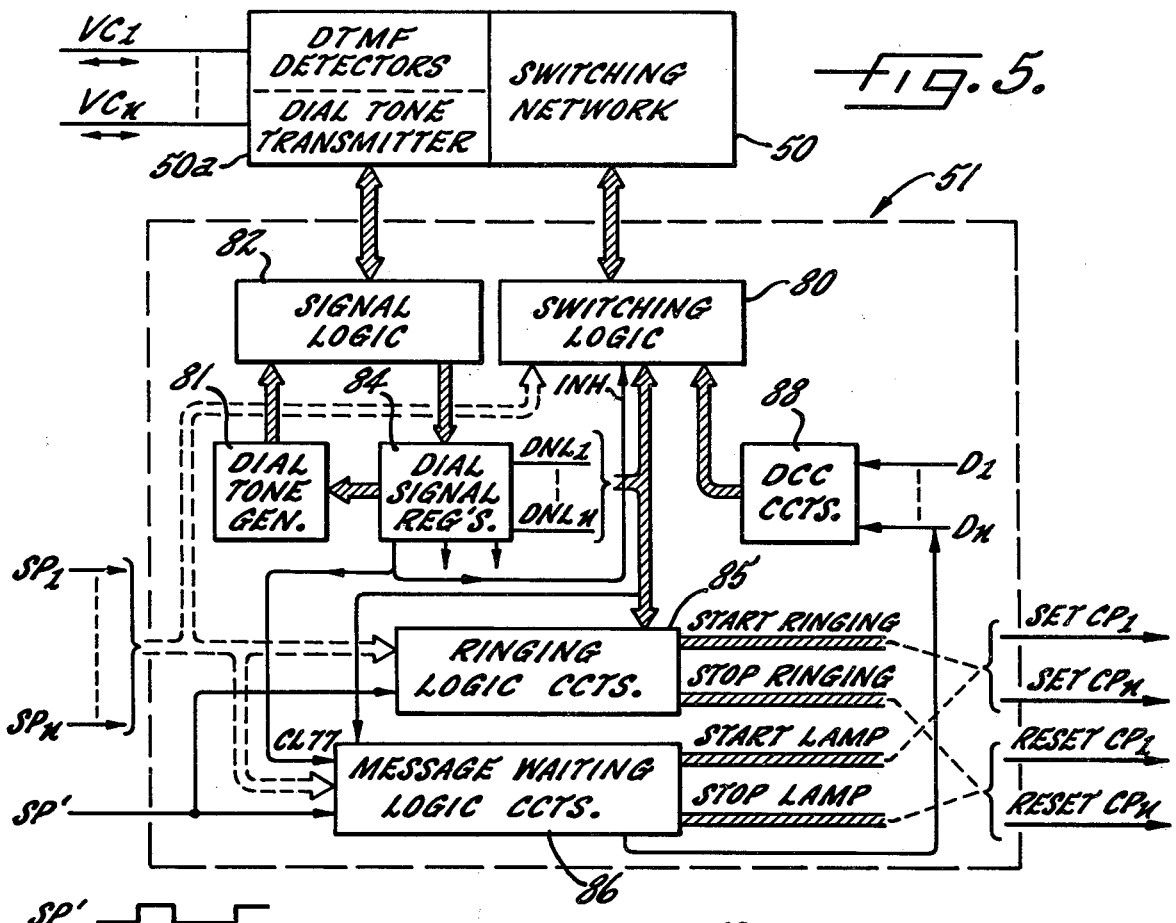
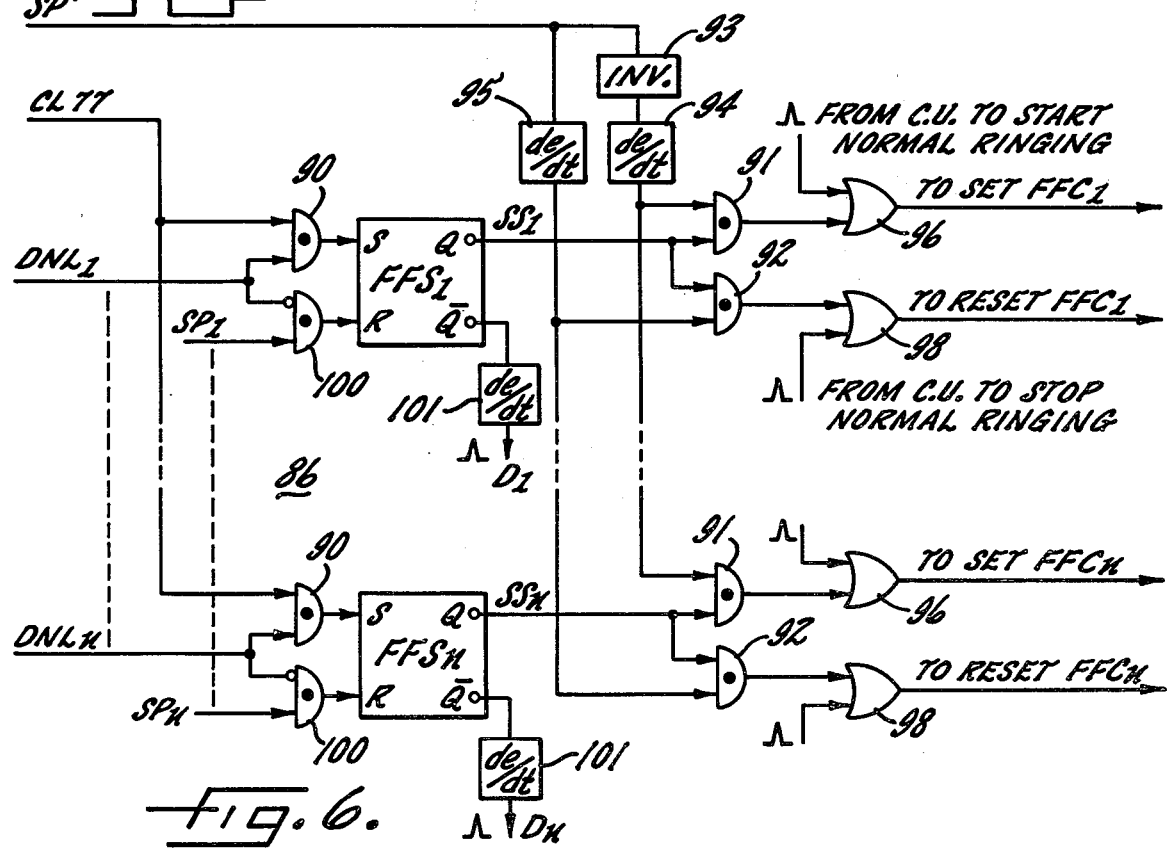

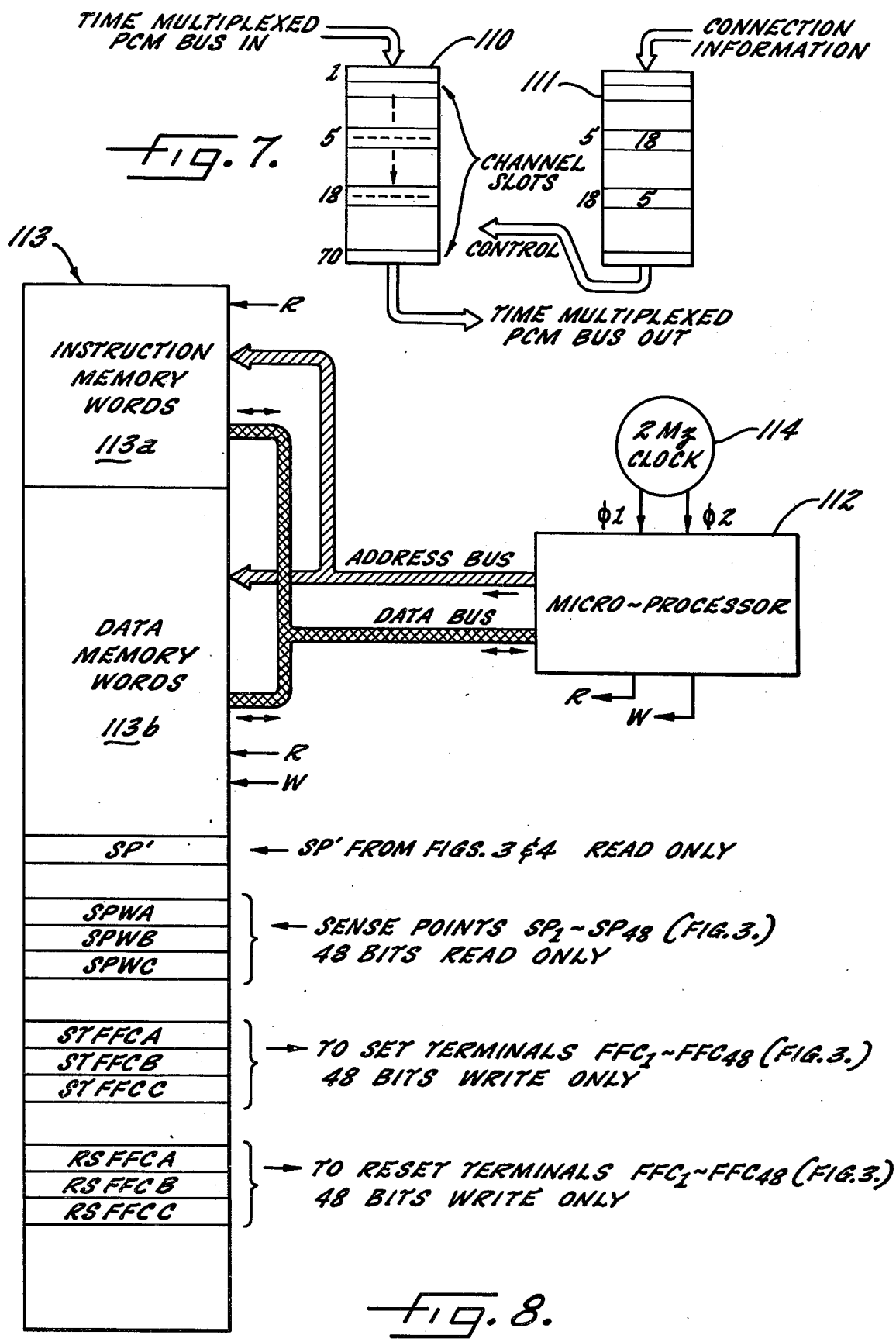

METHODS AND APPARATUS FOR SPECIAL STATUS INDICATION IN TELEPHONE SYSTEMS

BRIEF SUMMARY OF THE INVENTION

The present invention relates in general to telephone switching and control systems, and in particular to methods and apparatus for controlling the excitation of special status indicators, for example, message waiting lamps, in the individual ones of a plurality of telephone sets served by such systems. Although susceptible of use in association with central office systems, the methods and apparatus will find especially advantageous application in PBX systems serving hotels, motels and the like.

In prior "message waiting" status lamp control methods and apparatus, a separate source of high voltage pulses for exciting neon lamps in telephone sets was selectively connected onto a telephone set line upstream from the normally closed ringing relay contacts through a selector switch on a panel container one "message waiting switch" for each line. To prevent overloading of the separate voltage source and reduction of the effective voltage pulses below the level required to excite the lamp due to current flow through the station battery, an isolating diode was connected in one line. Not only did this require a separate panel with a large number of status switches, and a separate third wire leading to each line portion of the line equipment panel, but also the diode unbalanced the two-wire line and made more difficult the sensing of dc. line current in the presence of induced longitudinal noise voltages.

The primary aim of the present invention is to provide selective energization of special status indicators (such as message waiting lamps) in any one or more of a plurality of telephone sets by methods and apparatus which are simple to implement and reliable in operation.

A more specific object of the invention is to achieve selective special status signaling in a fashion which requires no modification in the line equipment hardware at the central location, except for minor and inexpensive changes in the ring generator circuitry which, as in conventional practice, serves a large plurality or sub-plurality of telephone sets.

It is a corollary objective of the invention to provide methods and apparatus to achieve economy and simplicity in selective excitation of special status indicators in a plurality of telephone sets by timed application of a ring generator signal to any line which has been placed in the special status category, — yet without ringing the bell in the phone set of that line and without interferring with the normal ringing function.

A related object is to provide an improved and advantageous ring generator, and a method of producing a ring generator output signal, which is capable of both ringing the bell with alternate on and off intervals and exciting a special status indicator during the off intervals.

DESCRIPTION OF THE DRAWINGS

The foregoing and other objects and advantages of the invention will become apparent as the following description proceeds in conjunction with the accompanying drawings, in which:

FIG. 1 is a generalized diagrammatic illustration of a control system serving a plurality of telephone sets equipped with special status indicators;

FIG. 2 is a generalized schematic diagram, partially in block form, illustrating the interior components of a single telephone set and the centrally located line equipment associated with that particular set;

FIG. 5 is a generalized block diagram illustrating the organization of pertinent portions of the system control unit and switching network;

FIG. 6 is a block diagram illustration of that portion of the control unit which serves to actuate the ringing relays of selected ones of the several telephone sets in order to apply the ring generator output to the lines of such sets with proper timing for excitation of associated special status indicators;

FIG. 7 is a diagrammatic illustration of a known time multiplexed PCM switching network;

FIG. 8 is a block diagram illustrating a microprocessor with associated instruction and data memory employed to form a second embodiment of the invention;

DETAILED DESCRIPTION

Figure 3:
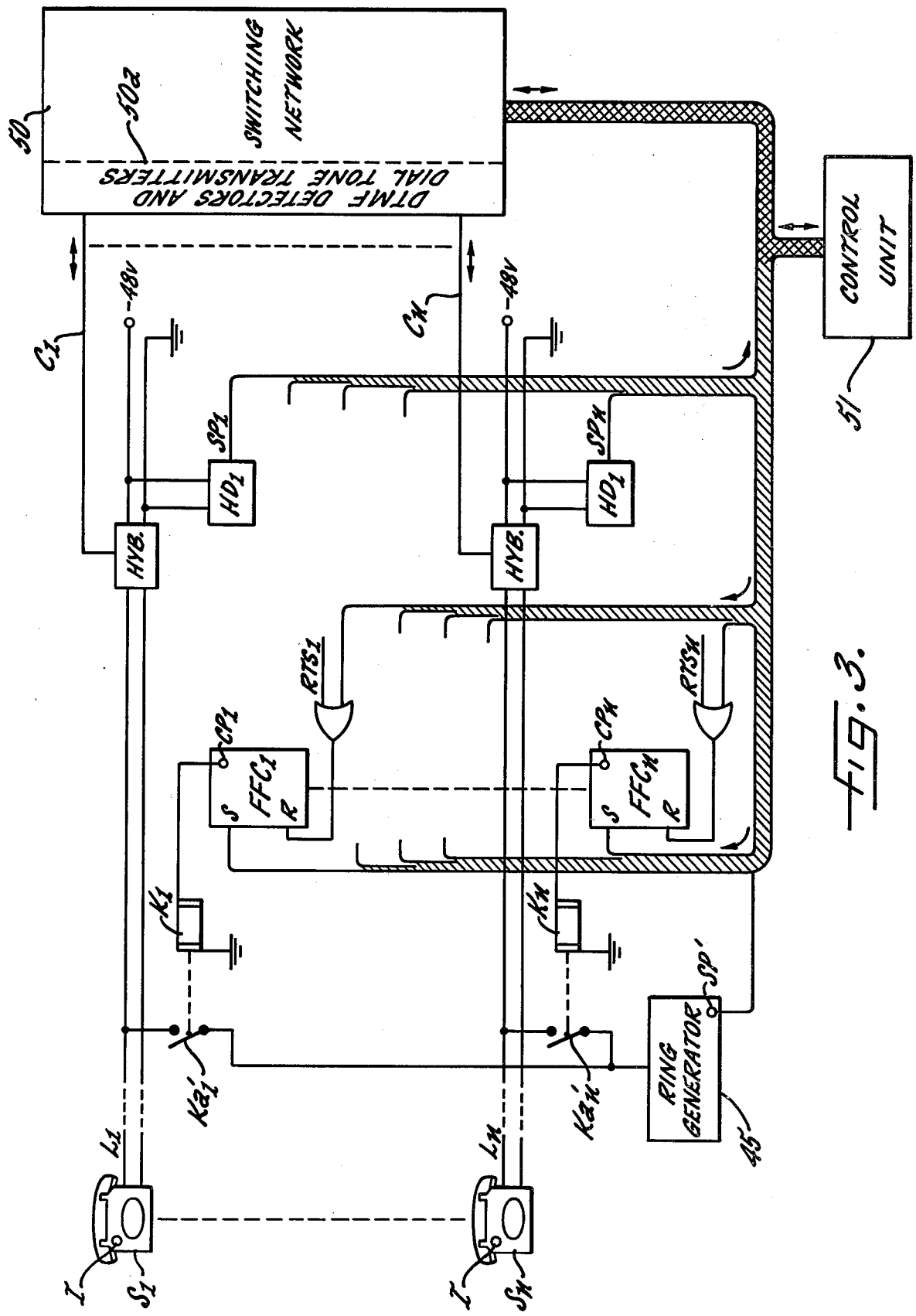
FIG. 3 is a diagrammatic illustration of the plurality of telephone sets and their respective portions of line equipment interfacing to a switching network and control unit.

To provide background environment, FIG. 1 illustrates a typical and well known telephone system in and with which the apparatus and methods of the present invention may be embodied and practiced. A relatively large number of telephone sets $S_1$ through $S_n$ are connected via two-wire lines $L_1$ through $L_n$ to a centrally located switching and control installation 10. The latter may be, for example, a PBX (private branch exchange) or central office associated with telephone sets of either a private group or a group of subscribers. For the sake of simplicity in the following discussion, it will here be assumed that there are forty-eight of the telephone sets $S_1$-$S_n$ (although the number in any actual system will usually be much greater), including those here designated as an attendant's console 11 and a message center set 12 associated with a recorded message playback device 14.

To convey some special status to the users of selected ones of the telephone sets, each set is equipped with a status indicator that is electrically energizable by a voltage substantially greater than that placed on the two wires of the telephone line by the conventional station battery. As an example, the indicators are here shown as neon lamps I (usually having red lenses) of the sort seen on telephones used in hotels, motels or similar applications. Again for purposes of discussion, it will be assumed that the "special status" to be signaled by visual excitation of any lamp I is a "message waiting" indication. The "message waiting" feature is frequently provided in installations for hotels, motels or the like. A flashing red light on a telephone indicates that some message has come in to an operator or attendant while the user of the telephone was absent, thereby informing the user that he should pick up his receiver to receive the message which is waiting. In the normal but not invariable practice, if an incoming call directed to the telephone in a particular room of a hotel finds a "don't answer" response, the caller will request the hotel PBX operator to take a message for the occupant directing him, upon his return, to call a certain person or take a certain action. The hotel operator or attendant will thereupon place the telephone for that particular line in a "message waiting" category, resulting in the associated lamp I being periodically flashed. Upon return to his room, the occupant will see the periodically flashing lamp, and thus contact a message center so that the message can be conveyed to him by the individual in charge of messages. In some instances, and in keeping with the present invention in one of its detailed aspects, when that occupant lifts his receiver and goes off-hook because he has seen a flashing indicator lamp, he will be connected directly to the recorded message playback device 14, from which a recorded voice message will instruct him to dial a certain internal number in order that he can receive a waiting message. Upon dialing that number and identifying himself, the occupant will then have the message read to him by the person in charge of message slips.

Turning now to FIG. 2, the principal internal components of a standard telephone set 15 are there diagrammatically illustrated as including tip and ring leads 16, 18 connected through contacts 19, 20 of a hook switch 21 to a miniature hybrid circuit 22 which converts the two-wire circuit into four wires forming transmit and receive channels. Two of those four wires lead to a receiver 24, while the remaining two wires lead from a transmitter 25 — all of these components being well known and conventional. Connected directly across the conductors 16, 18 is a split solenoid 26 for a bell 28, the two halves of the solenoid being joined in series by a capacitor 29 so as to block the flow of dc. current. Since station battery voltage (about 48 volts dc.) is normally applied between the leads 16, 18 the bell 28 and its solenoid 26 are constructed to respond to a low frequency ac. signal (having a frequency of about 20 Hz. and an amplitude of about 125 volts peak) superimposed upon the dc. station battery voltage. When such 20 Hz. ac. voltage is applied to the line, the bell 28 wil ring. The indicator lamp 30 associated with the telephone set 15 is here shown as a neon glow discharge lamp connected directly across the conductors 16, 18 through a current limiting resistor 31. The neon lamp 30, in keeping with conventional practice, is constructed to break down and conduct discharge current when a voltage of about 70 volts or more appears between the lines 16 and 18.

The dashed portions in the tip and ring leads shown in FIG. 2 illustrate that the two-wire line leading from the telephone set 15 may be of considerable length. Nevertheless, as shown, that two-wire line leads to a central location where an array 34 of line equipment is associated therewith. Specifically and as here shown, the ring and tip leads of the two-wire line are connected through normally closed contacts Ka and Kb of a ring relay K to the terminals of a two-to-four wire hybrid transformer 35. The interior details of the hybrid transformer or transformers are well known in the art and need not be described. It is sufficient to note that the hybrid includes transformer windings 35a and 35b in series between the contact points Ka and Kb and the negative and positive terminals of a station battery or power supply 36. In this fashion, the tip lead is normally grounded and the ring lead resides at −48 volts dc. relative to ground. Voice frequency signals in passing through the transformer windings 35a and 35b are coupled to or from a two-wire transmit path 38 and a two-wire receive path 39.

As in well known and standard practice, means are provided to sense the dc. resistance presented by the telephone line, or more accurately to sense dc. current which flows from the station battery. As here shown, relatively low valued current sensing resistors 40 and 41 are connected in series between the battery 36 and the hybrid 35, the dc. voltages appearing across such resistors serving as inputs to a hook detector 42 of conventional and well known organization. When the telephone set 15 is "on-hook" and the contacts 19, 20 open, the two-wire line normally presents a dc. resistance approaching infinity or at least exceeding about 20 K ohm. On the other hand, when the telephone set 15 is "off-hook" and the contacts 19, 20 are closed, the carbon particle transmitter 25 reduces the resistance between the ring and tip leads to a low value on the order of 200 ohms so that the battery 36 produces significant current flow through the resistors 40 and 41. The hook detector 42 is a threshold sensing device, and it will here be assumed that it produces a hook-condition signal on "sense point" terminal SP which is at a relatively high or low level (binary 1 or 0) when the telephone is off-hook or on-hook, respectively.

To supply the necessary ac. voltage to actuate the bell 28 for normal ringing operation, a ring generator 45 has its output connected to normally open contact point Ka' of the relay K. According to conventional practice, an ordinary ring generator produces an output signal which is superimposed upon the forty-eight volts of the station battery 36 and which consists of repeated two second bursts of 20 Hz. ac. voltage separated by alternate four seconds of zero voltage for bell silence. When the output of the ring generator is connected to the tip and ring lines, therefore, the bell normally rings for two seconds and is silent for four seconds in successive six second cycles. The ring generator 45 is common to all or a sub-plurality of the lines served by a given system. Thus, its output may, for example, lead to normally open contacts of relays associated with forty-eight telephone sets; and if more than forty-eight telephone sets are present in a system, one ring generator may be provided for each group of forty-eight.

To control the selective connection of the ring generator to the tip and ring leads, the relay K is actuated ot deactuated in response to an output signal from a control flip-flop FFC whose output terminal Q is here designated as a control point CP. In effect, the relay K and its flip-flop FFC collectively form a latching relay means which picks up in response to a set signal and drops out in response to a reset signal — to connect and disconnect the output of the ring generator 45 to the associated two wire line. When normal ringing is to begin, the flip-flop FFC is set by a signal received from the associated control unit and when normal ringing is to end, the flip-flop is reset. When the relay $K_1$ (usually dual form C) is energized because the flip-flop FFC is set, its contacts at Ka and Kb open, and its contacts at Ka' and Kb' close. When the relay K is actuated, therefore, the ring generator 45 is placed in a series circuit extending from the negative terminal of the station battery 36, the ring lead R of the line, the bell solenoid 26 and capacitor 29, and a ring trip detector 48 to ground. The ring trip detector responds only to dc. current and is insensitive to the 20 Hz. alternating current supplied by the generator 45 through the bell solenoid 26. As soon as the ringing telephone is answered and goes off-hook, however, some dc. current produced by the station battery 36 (which is in series with the ring generator) flows through the hybrid 22, the transmitter 25 and returns to ground through the detector 48. This dc. current is promptly sensed by the ring trip detector 48 which then produces a ring trip signal RTS passed through an OR circuit 49 to reset the flip-flop FFC, drop out the relay K and terminate ringing. As is well known in the telephone art, the ring trip detector is employed to terminate ringing immediately when the telephone set goes off-hook, thereby to avoid the user hearing a loud and unpleasant ringing signal passed to the receiver 24.

A general picture of the overall system may be seen in FIG. 3. A plurality of telephone sets $S_1$-$S_n$ have their two-wire lines $L_1$ through $L_n$ connected to a line equipment panel which comprises ringing relays $K_1$ through $K_n$ associated with those respective lines. Those relays are respectively controlled by flip-flops $FFC_1$ through $FFC_n$ whose output terminals may be designated control points $CP_1$ through $CP_n$. A single ringing generator 45 has its output terminal connected through contacts $Ka'_1$ through $Ka'_n$ to the respective lines $L_1$ through $L_n$, this showing in FIG. 3 being intended to represent the more detailed arrangement of relay contacts and the ring trip detector as described above with reference to FIG. 2.

FIG. 3 shows the four-wire channels $C_1$ through $C_n$ entering and leaving the respective hybrid transformers and communicating with a switching network 50. The several hook detectors $HD_1$ through $HD_n$ associated with the respective sets $S_1$ through $S_n$ produce hook condition indicating signals on sense points $SP_1$ through $SP_n$.

The signals on the sense points $SP_1$-$SP_n$ are routed via a multi-conductor cable to a control unit designated generally at 51. In this way, the control unit is informed as to whether each of the plural telephone sets is on-hook or off-hook and it responds to such information to control the switching system 50 in putting up and taking down call connections. The control unit 51 also determines when ringing is to be initiated in ordinary call processing and it initiates the ringing of any selected phone by supplying a "set" signal to the corresponding one of the control flip-flops $FFC_1$-$FFC_n$ to actuate the associated relay $K_1$-$K_n$ and thereby to connect the output of the ring generator 45 to the corresponding line. Similarly, when ringing is to be terminated because of an unsuccessful completion and an on-hook condition in the originating set, the control unit sends a reset signal to the reset terminal of the appropriate one of the flip-flops $FFC_1$ through $FFC_n$, thereby to drop out the associated relay. As indicated previously in FIG. 2, a ring trip response RTS for any set in a ringing status will send a signal through an OR circuit 49 to reset the associated flip-flop and thereby terminate the ringing. This happens automatically whenever a telephone set being rung goes off-hook.

Apparatus associated with but not forming an actual part of the switching network serves to detect and decode DTMF signals (or rotary dial pulses) when an originating telephone set begins to be dialed. That apparatus, represented at 50a, also sends a dial tone to any of the sets $S_1$ through $S_n$ after it goes off-hook, such dial tone being initiated by command signals from the control unit 51 which has been informed of a new off-hook condition. Thus, there is an interchange of control signals between the switching network 50, 50a and the line equipment, on the one hand, and the control unit 51, on the other hand, so that calls may be originated, dial tones provided, dialed digits sensed, ringing initiated, and two telephones switched into communication with one another. Because that operation, and the relatively complex equipment of the switching network, forms no essential aspect of the present invention and is well known to those skilled in the art, further discussion of the switching network is not required here.

The ring generator 45 is one which continuously produces an output signal which in waveform is made up of alternate intervals of (i) 20 Hz. ac. voltage (of sufficient amplitude to ring the bell in a phone set) for x seconds, and (ii) 0 volts for y seconds — where x and y are of predetermined durations, typically two and four seconds, respectively. If applied to a given one of lines $L_1$-$L_n$ by the corresponding relay $K_1$-$K_n$, the ring signal from the generator will thus cause the bell to alternately ring for x seconds and remain silent for y seconds, such sounding and silence recurring in cycles for as long as the relay remains actuated. For purposes of discussion in this case, it will be assumed that the x and the y seconds intervals are of two seconds and four seconds, respectively in duration; and in such case there will be a "sounding" of the bell for two seconds and "silence" of the bell for four seconds on a recurring cycle basis with each cycle occupying a total of six seconds. A given telephone set $S_1$-$S_n$ is said to be "ringing" when its relay $K_1$-$K_n$ is picked up, even though the actual ringing sound is two seconds on and four seconds off during each successive six second cycle.

In accordance with an important feature of the present invention, a voltage sufficient to excite the special status indicator or lamp in a plurality of telephone sets is applied to the two-wire line of any telephone set which has been placed in a special status category by a status signal created in the control unit 51 — but such voltage is so applied only during at least a portion of the y seconds "silence" intervals measured off by the ring generator. In the preferred embodiment to be described, no part of the line equipment requires modification, but the ring generator is constructed to produce in its output signal, during the y seconds intervals, a voltage which when applied to any of lines $L_1$-$L_n$ will visibly excite the lamps I of the corresponding sets of $S_1$-$S_n$. In response to a special status designation (e.g., message waiting) in the control unit for any given telephone set, the control unit causes actuation of the associated relay only during and for at least a portion of the y seconds intervals, so that the associated lamp is turned on (in a steady or periodically flashing manner) at least once every x + y seconds. By virtue of the timing in the controlling of the relay, the bell of such telephone set does not sound, and the indicator lamp is not excited during the x seconds intervals unless, of course, the associated relay has been picked up in response to a normal ringing instruction.

Figure 4:
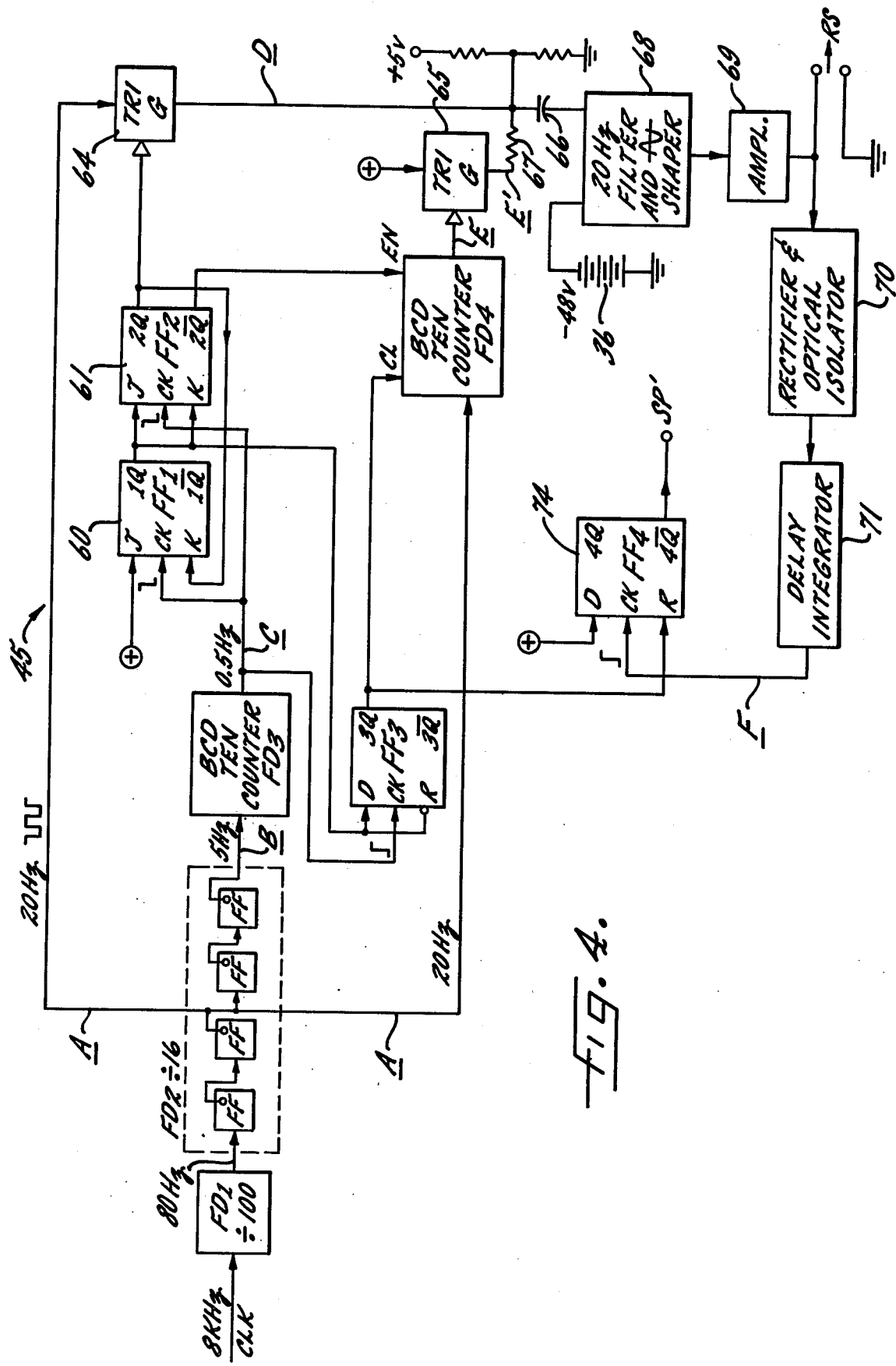
FIG. 4 is a block diagram illustrating the details of an improved ring generator, as it may be embodied in an exemplary form, for use in the methods and apparatus of the present invention.

To bring about this result, the ring generator 45 is constructed as shown in FIG. 4 with improvements which create in its output signal RS, during the normal y seconds silence intervals, a voltage capable of exciting the indicators or lamps in a plurality of telephone sets. The ring generator 45 receives as its basic input squarewave clock pulses from any suitable source and here shown as having an 8 KHz. frequency. Those pulses are passed through a frequency divider $FD_1$ having a division ratio of one hundred to create a squarewave signal with a frequency of 80 Hz. and the latter is passed through a frequency divider $FD_2$ having a division ratio of sixteen to provide a recurring squarewave signal B having a frequency of 5 Hz. The signal B is, in turn, fed to a third frequency divider FD3 constructed as a BCD ten counter coupled, in well known fashion, to produce an output signal C at a high level only when the contents of the counter is representative of the decimal value nine. The frequency divider FD3 thus makes its output signal C have a frequency of 0.5 Hz. with a 1:10 duty cycle. The signal C is then applied to a pair of JK flip-flops 60 and 61 cross-coupled so as to produce a timing signal at terminal 2Q which is alternately two seconds high and four seconds low.

The divider chain as shown in FIG. 4 also serves as a source of 20 Hz. squarewave signals here labeled A. Because the frequency divider FD2 is constructed in known fashion with four flip-flops in tandem, the first of those flip-flops produces an output signal of 40 Hz. and the second of those flip-flops thus produces an output signal of 20 Hz. The latter signal is ultimately converted, as hereinafter described, to a 20 Hz. sinusoidal voltage capable of actuating the bells in a plurality of telephone sets.

Figure 4A:
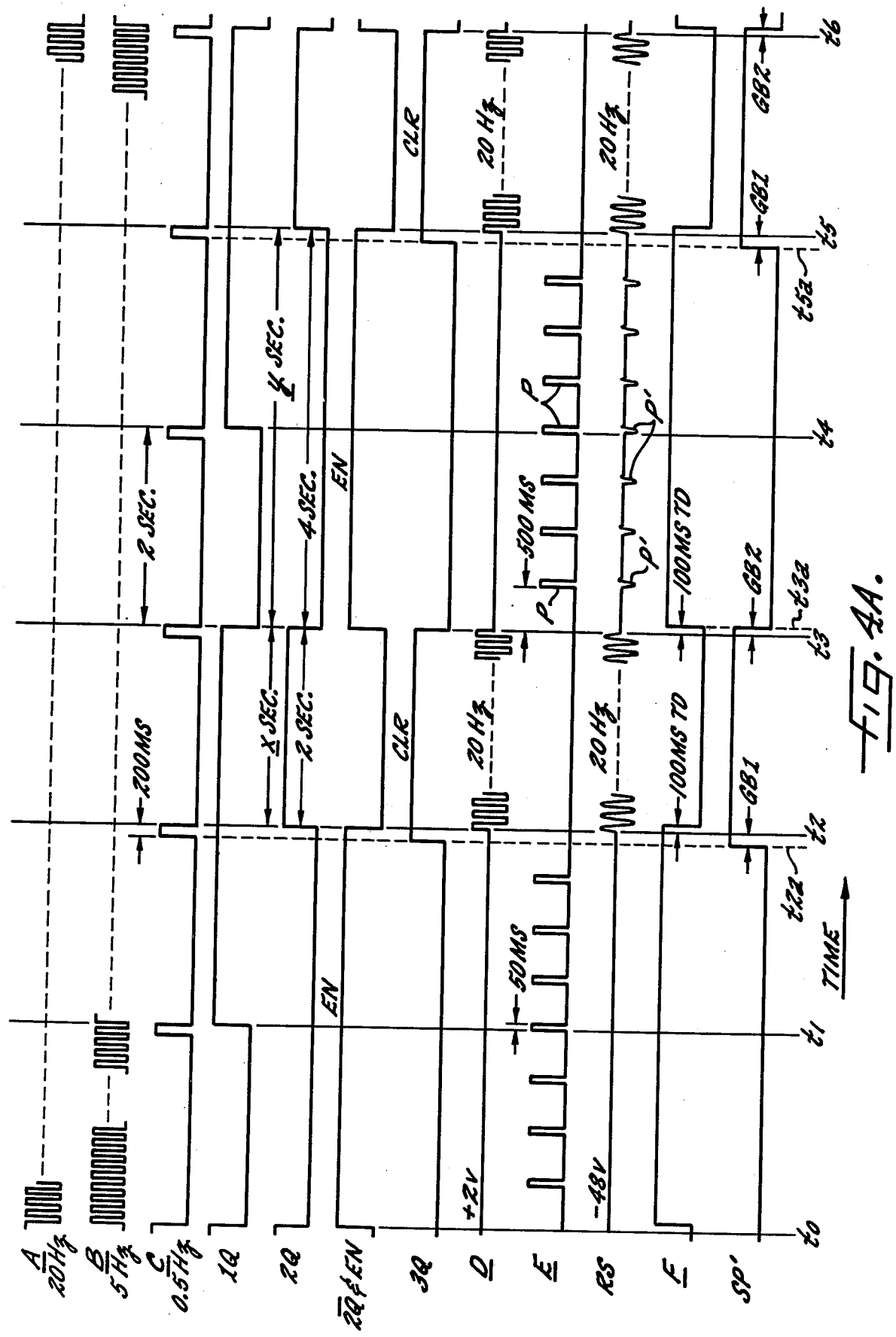
FIG. 4A is a diagram illustrating the relative timing of certain signals or voltages as they appear during the operation of the ring generator shown in FIG. 4.

Referring to the waveforms set out in FIG. 4A, the signal A represents the continuous 20 Hz. squarewave obtained from the output of the second flip-flop in divider FD2. The 5 Hz. signal B shown in FIG. 4A is that which appears at the output of the frequency divider FD2, while the signal C as shown in FIG. 4A appears at the output of divider FD3 with a frequency of 0.5 Hz. Because the count-to-ten counter FD3 receives a 5 Hz. input, its output signal C is in the form of voltage pulses spaced apart in time by two seconds and each having a width of 200 m.s. It is these latter pulses in the signal C which are applied to the clock input terminals CK of the flip-flops 60 and 61.

Assuming that both flip-flops initially reside in the reset state (so that their output terminals 1Q and 2Q reside at a 0 level as indicated between instants $t_0$ and $t_1$, in FIG. 4A), the negative-going edge of the next-arriving pulse at time instant $t_1$ in the C waveform triggers the flip-flop 60 to a 1 state (because that flip-flop's control terminal J is permanently held at a 1 level), while no response is created in the flip-flop 61 (because that flip-flop's control terminal J was residing at a 0 level supplied from the terminal 1Q). See waveforms 1Q and 2Q in FIG. 4A. When the next negative-going edge in the signal C appears at time instant $t_2$, no response occurs in the flip-flop 60 because it is already in the set state; but the flip-flop 61, receiving a 1 level signal from terminal 1Q, switches from the 0 to the 1 state. When a third negative-going wavefront in the signal C appears at instant $t_3$, the K terminal of flip-flop 60 is high, while the J and K terminals of flip-flop 61 are high; and in consequence, both flip-flops toggle to revert to the 0 state. It will therefore be seen from FIG. 4A that the signal at 1Q is alternately two seconds low and four seconds high while the signal at terminal 2Q is alternately four seconds low and two seconds high. The latter signal provides the basic timing for ringing of telephone bells two seconds on and four seconds off during normal ringing conditions.

The signal from 2Q is applied as a controlling input to a tri-state gate 64 which receives as its main input signal the 20 Hz. waveform A. As indicated in FIG. 4A, the output D of the gate 64 is therefore alternately a 20 Hz. squarewave for two seconds and steady for four seconds — this being illustrated by the waveform D between instants $t_2$ and $t_3$ and between instants $t_3$ and $t_5$. A voltage divider supplied from a +5 volt source biases output of gate 64 so that the signal D is a 20 Hz. squarewave rising above and falling below +2 volts, and taking on a steady +2 volt value when the 2Q signal is at a 0 level.

To produce a signal which contains time-spaced d.c. voltage pulses during the alternate intervals of four seconds (the normal bell "silence" intervals when the signal from 2Q is low), the 20 Hz. signal A is applied to the input of a frequency divider FD4 constructed as a BCD count-of-ten counter. The latter is controlled by the signal from $\overline{2Q}$ applied to its enabling terminal EN and by an output signal from the terminal Q3 of a D type flip-flop FF3 applied to its clear and disable terminal CL. The flip-flop FF3 triggers on positive-going wavefronts applied to its clock terminal CK by the signal C while its D and R terminals receive the true and inverted forms of the signal from 1Q. This results in the flip-flop FF3 being switched from a reset to a set state at that instant $t_{2a}$ (FIG. 4A) when a positive-going wavefront appears in a pulse of signal C during those time intervals when the signal 1Q is high. The flip-flop FF3 resets when the signal at 1Q falls from a high to a low value. Thus, as shown in FIG. 4A the control signal 3Q goes high at an instant $t_{2a}$ which precedes the instant $t_2$ by 200 milliseconds, and it goes low at the next instant in time ($t_3$) when the signal 1Q falls from a 1 to a 0 level. Therefore, the frequency divider or counter FD4 is held in a cleared and disabled state between the time instants $t_{2a}$ and $t_3$ in FIG. 4A (this interval slightly exceeding the two second interval during which the signal 2Q is high). When the four second interval begins at instant $t_3$, however, the counter FD4 is enabled by the signal from $\overline{2Q}$ and it begins counting the 20 Hz. pulses supplied to its input. The output of the counter FD4 is therefore a signal E which consists of a series of pulses P which are fifty milliseconds wide and spaced apart in time by five hundred milliseconds (that is, having a frequency of 2 Hz.). As shown at E in FIG. 4A, these pulses P appear only during the four second "silence"

intervals, the first one occurring 500 milliseconds after that four second interval begins.

The pulses in waveform E form a control input to a second tri-state gate 65 whose input is held permanently at a positive voltage or binary 1 level, with the result that an identical waveform E' appears at the output of that gate. The signals D and E' are combined (the latter passing through a series dropping resistor 67 so it is reduced in amplitude) and fed through a dc. isolation capacitor 66 to the input of a 20 Hz. filter (which may be an active filter) and sinusoidal wave shaper 68. The reference input terminal of that filter is connected to the negative terminal of the associated 48 volt station battery or power supply so that the pulses in the signals D and E' produce at the output of the filter sinusoidal variations which rise and fall relative to a steady $-48$ volt bias. The output of filter 68 is passed through an amplifier 69 to form a final ringing signal RS which is the output signal of the ring generator 45.

From FIG. 4A it will be seen, therefore, that the signal RS is in its waveform alternate two and four second intervals, the first containing sinusoidal 20 Hz. ac. voltage swinging about a $-48$ level, and the latter containing time-spaced negative-going sinusoidal half wave pulses P' each created in response to one of the fifty millisecond pulses P occurring in the waveform E. It is this modified ring signal RS (containing the pulses P') which is fed to normally open contacts of all of the relays $K_1$ through $K_n$ and which will be applied to the tip and ring lines of any selected telephone set when the corresponding relay is actuated, as explained above with reference to FIGS. 2 and 3. The filter 68 and the amplifier 69 in FIG. 4 are preferably chosen such that the amplitude of the 20 Hz. ac. voltage during the alternate two second intervals is about 125 volts peak and thus sufficient to ring a standard telephone bell. The signals received from the tri-state gate 65 are in amplitude and duration such that the negative-going, time-spaced pulses P' in the signal RS during the alternate four second intervals are approximately 50 volts in amplitude (falling to an absolute value of about $-98$ volts) and sufficient (when applied across the tip and ring lines of a telephone set) to cause breakdown and discharge of the neon lamp in that set. During normal ringing when a given relay is actuated for an extended period of time, the neon lamp will be visibly excited during both the two and four second intervals but the bell will sound only during the two second intervals. If a given relay is actuated only during the four second intervals measured off by the ring generator 45, the lamp in that set will flash seven times during each four second interval, but the associated bell will not sound. It is, of course, within the scope of the present invention to apply pulses of different widths or spacings to indicator lamps during the alternate four second or "bell silence" intervals. And, indeed, it would be possible and feasible to apply a steady state dc. voltage to the lamps during essentially all or a selected portion of the four second intervals.

To provide an indication to the control unit 51 as to the condition of the ring generator, that is, whether the output signal RS is in the 20 Hz. "on" portion or the "bell silence" portion of its cycle, a sense point SP' is associated with means to make the sense point signal high or low when the 20 Hz. ac. signal is or is not present. An important object is to make the sense point signal assuredly a predetermined bistate level (here, high) when the 20 Hz. alternating voltage is present in order to drop out any previously actuated ringing relay during a "bell silent" interval, thereby to avoid the relay contacts opening at an instant when the signal RS is at or near a "peak" of the 20 Hz. voltage. If the relay were to open its contacts at such an instant, the discharge and dissipation of stored energy in the bell capacitor 29 (FIG. 3) might create undesirable, spurious harmonic noise. To create the sense point signal at SP', the output signal RS is fed back to a rectifier and optical isolator 70 which responds to positive half cycles of ac. and reduces the voltage level. Its output is passed through a delay integrator 71 whose output F thus looks like the envelope of the ringing signal RS, except it is delayed relative to the latter by a predetermined time delay of about 100 m.s. (see FIG. 4A). The isolator 70 and the integrator 71 are constructed to produce no response to the individual spaced pulses P' which appear in the signal RS during the four second "silent" intervals. The positive-going wavefronts of the signal F are fed to the clock input CK of a D-type flip-flop 74 whose D terminal is connected continuously to a 1 level voltage source and whose reset terminal R is connected to receive the signal 3Q from flip-flop FF3. As a result of these connections, the flip-flop 74 is switched to its set state by each positive-going wavefront in the signal F if the signal from 3Q is then low; and the flip-flop 74 is reset and held reset so long as the signal from 3Q is high. Thus, as shown in FIG. 4A, the sense point signal SP' at the $\overline{4Q}$ terminal swings high at the instant $t_{2a}$ when signal 3Q swings high; and it thereafter swings low at an instant $t_{3a}$ when the signal F swings high after an approximate 100 m.s. delay from the instant $t_3$ at which the signals 2Q and 3Q swing low. Since the 20 Hz. ac. voltage is present in signal RS from instants $t_2$ to $t_3$, the sense point signal SP' is somewhat longer, having "guard bands" GB1 and GB2 at the beginning and the end. The guard band GB1 (equal in width to a pulse in signal C) exists between instants $t_{2a}$ and $t_2$, and the guard band GB2 (100 m.s. wide due to the delay created by the integrator 71) exists between instants $t_3$ and $t_{3a}$. Therefore, whenever the signal SP' is low, there is a reliable, affirmative indication that the signal RS is in its "bell silent" state. Of course, the signal SP' recurs with the guard band timing here explained at a rate of one cycle every six seconds. If the contacts of any ringing relay $K_1$ through $K_n$ are opened or closed while the sense point signal SP' is low, then such contact state change will necessarily transpire at an instant when the 20 Hz. ac. voltage is not present in the output of the ring generator 45.

As noted above with reference to FIG. 3, the control unit 51 sends signals to the control flip-flops $FFC_1$ through $FFC_n$ to selectively set or reset the latter, and it receives signals $SP_1-SP_n$ as indications of the hook status in the respective telephone sets $S_1-S_n$. Moreover, the control unit 51 receives the sense point signal SP' from the ring generator 45 which serves in common a sub-plurality or the entire plurality of the telephone sets $S_1-S_n$. These inputs and outputs appear in FIG. 5 where the control unit 51 is shown in somewhat more detail. Because the control unit is well known in the art and may take a variety of specific forms, only those portions which are pertinent to the present invention will be discussed with reference to the more specific apparatus shown in FIG. 6. Before turning to FIG. 6, however, it will be helpful to review here the control unit organization and operation in a general sense as they are known to those skilled in the art.

In normal call processing, when any telephone set $S_x$ goes off-hook, the new origination is detected from the signal change at the corresponding sense point $SP_x$ by switching logic 80 which acts to connect the output of one of a plurality of dial tone generators 81 to the corresponding line $L_x$. The call originator then dials the number which he wishes to reach and as DTMF (dial tone multi-frequency) digits for the called number arrive over the line $L_x$, they are detected by a DTMF detector at 50a, passed through signal logic circuits 82, and collected in one of a plurality of registers 84 which then signals the number of the called line $L_y$. Ringing is initiated on the line $L_y$ by ringing logic circuits 85 which respond to the called number signals, such initiation being accomplished by sending a "set" signal to the control flip-flop $FFC_y$ to pick up the associated ringing relay $K_y$ (FIG. 3) — whereupon the output signal RS of the ring generator 45 is continuously applied to the line $L_y$. The signal RS (FIGS. 4 and 4A) sounds the bell in set $S_y$ for two seconds on and four seconds off.

When the user at set $S_y$ answers and the set goes off-hook, the ring trip device 48 (FIG. 2) for that set terminates the ringing. The change at sense point $SP_y$ is detected by the switching logic 80 and the latter conditions the network 50 so that called line $L_y$ is connected to the calling line $L_x$. Subsequent on-hook signal changes at $SP_x$ and $SP_y$ are detected by the switching logic 80 to take down the call connection. In the event that the calling line $L_x$ goes on-hook before its dialed call connection is established in the switching network 50, the new on-hook signal at $SP_x$ cause the ringing logic circuits 85 to send a reset signal to the flip-flop $FFC_y$, whereupon relay $K_y$ is deactuated to terminate the ringing of the corresponding set $S_y$.

As any particular line is dialed, its identity is signaled by a high level voltage on the corresponding one of a plurality of "dialed number" lines $DNL_1$–$DNL_n$ shown associated with the dial signal registers 84. Included in the apparatus associated with these registers are special access code detectors which produce signals in response to dialed codes that do not represent a called line. For example, if the access code for the message waiting feature setup is 77, then a code line $CL_{77}$ will be set to a high state, after which a normal group of digits for a line number may be dialed. The presence of such an access code inhibits the switching logic 80 from processing the call in a normal fashion, and such an access code causes a special status indication for the dialed line number to be established in the message waiting logic circuits 86 to be discussed below. It may be seen from FIG. 5 that the message waiting logic circuits 86 receive as their inputs the sense point signals $SP_1$–$SP_n$, the sense point signal SP', the code line $CL_{77}$ corresponding to the message waiting feature, and the dialed number lines $DNL_1$–$DNL_n$.

In carrying out the present invention, a continuous ring signal which in waveform is made up of alternate first and second intervals of predetermined durations of x and y seconds, with low frequency ac. voltage present in the first intervals, is created. This is accomplished by the ring generator 45 which has already been described with reference to FIGS. 4 and 4A. Further in keeping with the invention, that ringing signal is selectively switched onto the line of a called set to produce normal ringing in a conventional fashion as described with reference to FIG. 5. Finally, provision is made in the practice of the invention to apply — to the line of any of the plural telephone sets $S_1$–$S_n$ which has been placed in a special status — a voltage which is timed to appear during the second intervals y of the ringing signal generator cycles and which is sufficient to actuate the status indicator (visibly excite the lamp) of that set without ringing the bell of that set. This is accomplished by the apparatus shown in FIG. 6 cooperating with the ring generator 45 in a manner now to be described.

Let it be assumed that the access code for the message waiting feature is 77 as mentioned above. To place a given one of the telephone sets in a message waiting status and to signal that status, an operator or an attendant may originate a call and dial the code digits 77. When this occurs, the code line $CL_{77}$ shown in FIGS. 5 and 6 will switch to a high level. Thereafter, the operator or attendant dials the number of the set which is to be placed in a message waiting status. The signal at $CL_{77}$ forms an inhibit signal INH which prevents normal call processing by the switching logic 80, but after those dialed digits have been received, one of the dialed number lines $DNL_1$ $DNL_n$ will switch to a high level. This condition will be detected by an output passed from one of a plurality of AND gate 90 leading to the setting input terminals S of a corresponding plurality of status flip-flops $FFS_1$ through $FFS_n$ (FIG. 6). Accordingly, a special status signal $SS_1$ through $SS_n$ corresponding to the dialed line number will be switched to a 1 state. It will be understood that the AND gates 90 and the status flip-flops $FFS_1$–$FFS_n$ permit the special status signal for any desired one or more of the telephone sets to be placed at a level indicating that those particular sets are in message waiting status.

To signal the message waiting status to the user of any set $S_1$–$S_n$, the status signals $SS_1$–$SS_n$ are applied to logic gates associated with each of the flip-flops $FFS_1$–$FFS_n$ shown in FIG. 6. Taking the flip-flop $FFS_1$ as an example, the status signal $SS_1$ is applied as an enabling input to a pair of AND gates 91 and 92. The signal SP' from the ring generator is routed through an inverter 93 and a differentiator 94 to the other input of the gate 91, whereas that sense point signal SP' is routed without inversion through a differentiator 95 to the input of the other gate 92. The output of the gate 91 is passed through an OR circuit 96 to the setting terminal of the control flip-flop $FFC_1$ (FIG. 3), whereas the output of gate 92 is routed through an OR circuit 98 to the reset terminal of that same control flip-flop. The second inputs of the OR gates 96 and 98 lead from the ringing logic circuits 85 of FIG. 5 so that the latter may independently set and reset the control flip-flop $FFC_1$ for normal ringing and normal termination of ringing as explained above.

It will be apparent that when the status signal $SS_1$ is at a high level because the telephone set $SS_1$ has been placed in a message waiting status, at each negative-going wavefront in the signal SP' (see FIG. 4A) the gate 91 will send a positive-going pulse through the circuit 96 to set the flip-flop $FFC_1$. This will occur always at the instant corresponding to $t_{3a}$ (FIG. 4A) within each ring signal cycle, and thus the flip-flop $FFC_1$ will be set at an instant which occurs early (about 100 m.s. after instant $t_3$) in each four second interval. Accordingly, the relay $K_1$ will pick up (within an actuation time of about 10 m.s.) so that the signal RS will be applied to the line $L_1$. As a result, the time-spaced pulses P' in that signal will cause the associated indicator lamp in set $S_1$ to visibly flash. Near the end of that same four second interval, however, the signal SP' will revert to a high level and the differentiator 95 will produce a pulse passed by the gate 92 and the circuit 98 to the reset terminal of control flip-flop $FFC_1$. As indicated by way of example in FIG. 4A, this occurs at the instant $t_{5a}$ and about 200 milliseconds prior to the instant $t_5$ at which the 20 Hz. alternating voltage will next appear in the ring signal RS. Accordingly, by the time the next two second interval (from instant $t_{5\ L\ to\ t6}$) begins and the 20 Hz. bell-exciting voltage appears, the relay $K_1$ will have been deactuated to disconnect the ring generator from the line $L_1$. Thus, bell in the set $S_1$ will not ring. The operation described will repeat over-and-over during successive six second cycles of the ring signal RS, the indicator lamp in the set $S_1$ being rapidly and visibly flashed during the four second interval of each cycle and left deenergized during the two second interval of each cycle. Whenever the user of a telephone set in the message waiting status returns to its location, therefore, he will be apprised by the flashing lamp that some message is waiting for him and that he should pick up his receiver to obtain that message.

In accordance with another aspect of the present invention, when the user of a telephone set in the message waiting status goes off-hook because he sees the periodically flashing lamp, he will be immediately connected to an attendant or to a recorded message playback unit so as to be advised that he has a message waiting for him. Direct connection processing of calls to a particular number without dialing of that number is a function carried out by many types of commonly used and well known telephone control systems. As shown in FIG. 5, direct call connection circuits 88 are associated with the switching logic 80 and responsive to single bit signals received on any one of lines $D_1$ through $D_n$ to establish a direct call connection to a preselect number. Let it here be assumed that the given number to which direct call connections will be made is 5476. That number is associated with set 12 and recorded tape playback unit 14 (FIG. 1), the latter continuously and audibly repeating, for example, the words "There is a message waiting for you. Please call number 7872 to receive that message". At the number 7872 will be a "message operator" having message call slips in front of her containing various messages such as "Call home immediately" or "Meet Sam at his office at 5:30". These specific messages will have been written down on message slips at the time they were received by the attendant or switchboard operator after a "don't answer" response occurred when an incoming caller tried to reach a particular one of the telephone sets.

The apparatus shown in FIG. 6 may be employed to effect direct connections to a specific, predetermined number or set when the user of a telephone in the message waiting status goes off-hook. For this purpose, and again referring to the status flip-flop $FFS_1$ by way of example, the reset terminal of that flip-flop is connected to the output of an AND gate 100 which receives the complement or inverted counterpart of the signal $DNL_1$. Therefore, if an incoming call is not being directed toward the telephone set $S_1$ which is in a message waiting status (and the signal at $DNL_1$ is low), and that set goes off-hook so that its sense point $SP_1$ switches to a high level, the flip-flop $FFS_1$ will be reset, thereby removing the status signal $SS_1$ and simultaneously producing a positive-going voltage transition at the Q terminal of the flip-flop. The latter transition is passed through a differentiator 101 to the terminal $D_1$ in FIG. 5, whereupon the telephone set $S_1$ will be directly connected to the voice recording at the assigned telephone number, e.g., 5476 as assumed above.

Thus, once a given one of the several telephone sets $S_1$-$S_n$ has been placed in a message waiting status, and its indicator lamp is being flashed during spaced intervals of four seconds, — that telephone set is automatically removed from its message waiting status when it goes off-hook (because the special status signal SS is removed), and simultaneously that telephone set is directly connected to a magnetic tape playback unit or an attendant's desk so that the user is advised to call a certain number and receive his previously-received and written message. In the event, however, that an incoming call is being directed toward a telephone set in the message waiting status at a time when that set goes off-hook, its dialed number line DNL will be at a high level, whereupon "clearing" of the message waiting status signal SS and direct connection to an assigned number, will be inhibited. That is, the AND gate 100 would prevent resetting of flip-flop $FFS_1$ if set $S_1$ is the one being considered. The incoming call will ring the telephone set normally even though it is in the message waiting status, and that incoming call may be answered in the normal fashion without destroying the corresponding message waiting status signal SS. Of course, when a telephone set in message waiting status is ringing in response to an incoming call, its indicator lamp will continue to flash, but such flashing will continue after the incoming call has been completed and terminated. The user will thus be prompted to pick up his receiver, whereupon the direct connection described will be made.

The operations here treated may take place with respect to any one or more of the telephone sets $S_1$-$S_n$. The apparatus shown in FIG. 6 in association with the line $DNL_1$ (and set $S_1$) is duplicated for all of the remaining lines $DNL_2$-$DNL_n$ (and sets $S_2$-$S_n$), with the differentiators 94 and 95 supplying timed signals in common to all of the gates 91 and 92. The several status flip-flops $FFS_1$ through $FFS_n$, when reset, create output signals $D_1$ through $D_n$, respectively, so that when any telephone set in the message waiting status goes off-hook (in the absence of an incoming call routed thereto), the direct call connection circuits 88 will connect that set to a predetermined number (e.g., 5476). Of course, the special status indicators in the individual telephone sets may be audible indicators rather than visibly flashable lamps, and the status indicated may be other than "message waiting".

In review, the control unit 51 and its ringing logic circuits 85 form conventional means for applying the cyclically repeating ring signal RS to the tip and ring conductors of any given telephone set when an incoming call is directed to that set; and this is done by setting the associated control flip-flop FFC to actuate the associated relay K. The flip-flops $FFS_1$-$FFS_n$ constitute means settable to indicate a special status for any one or more of the telephone sets by making the corresponding status signal $SS_1$-$SS_n$ have a logic 1 level. The gates 91 and 92 associated with each of the sets $S_1$-$S_n$ provide means responsive to a status indication for any given set to apply to its tip and ring leads a voltage which is timed to appear during at least a portion of the second intervals y and which in nature will activate the special status indicator, but not the bell, of that set. Timing is obtained, in the preferred form, from the sense point signal SP' produced by the ring generator 45 and the indicator-activating voltage is advantageously, but not necessarily, produced by the ring generator circuits so it is present in the ring signal RS during the "bell silent" intervals of y seconds. Also, the circuits of the ring generator (in producing the signal SP' which controls the gates 91, 92) forms a means to apply the ring signal RS to the line of a set in the special status after a short, predetermined delay (e.g. GB2) from the instant that each second interval begins, and to remove that signal at an instant which precedes by a short predetermined period (e.g. GB1) the instant at which each of said second intervals ends. Finally, it will be perceived that the sense point signals $SP_1-SP_n$ from the hook detectors $HD_1-HD_n$ serves as inputs to the several gates 100 (FIG. 6) which act with their respective flip-flops $FFS_1-FFS_n$ to remove (switch to 0 level) any special status indication signal $SS_1-SS_n$ when the associated telephone set goes off-hook and its hook signal changes from a 0 to a 1 level. Such gates 100, with inverters at inputs coupled to the respective lines $DNL_1-DNL_2$, also form a means to disable the removal of the special status signal of any set if the latter goes off-hook at a time which it is receiving or is about to receive an incoming call.

AN ALTERNATIVE EMBODIMENT

In the more recent telephone switching systems, analog voice signals going from different lines are periodically sampled and converted into pulse amplitude modulation (PAM) form, the time-spaced pulses for several channels or phone lines being interleaved by time division multiplexing, and then converted into PCM (pulse code modulation) digital form. The "information" in each successive sample for each channel is thereby represented as a numerical value signaled as a multi-bit binary word. A switching "connection" is made in a "network" by taking incoming binary information words from two channels, swapping them, and sending each back as the outgoing binary word of the opposite channel.

Such PCM systems are known in the art. They are described, for example, in "A Review of Telecommunication Switching Concepts" by S. G. Pitroda, Parts I and II published in the February and March 1976 issues of TELECOMMUNICATIONS magazine (see particularly FIG. 12). It will suffice to observe here that an information memory 110 (FIG. 7) may have the successive channel information words written in sequence into its successive multi-bit word locations. After each incoming channel word is written, the "cross connection" represented in an associated instruction memory register 111 is made, causing the information contents of one channel to be read out from the information register as the outgoing PCM word for the other channel. An example may be considered with reference to FIG. 7 wherein seventy possible channels are represented by seventy successive slots in the information memory 110. Seventy incoming signals will appear sequentially as PCM samples on a time shared input bus, and the outgoing signals will similarly appear sequentially on a time multiplexed PCM output bus. If channel 5 is to be "connected" to channel 18, then the connection instruction written into the information memory 111 includes an eighteen in the channel 5 slot and a five in the channel 18 slot. By time-repeated scanning of the successive slots in synchronism with incoming PCM words, the incoming numerical information from channel 5 is written into the No. 5 slot of memory 110; thereafter, the memory 111 is read to find the value eighteen at the No. 5 slot, and the resulting output signals from memory 111 will control reading of the memory 110 to send the information word from slot 18 out on the PCM output bus in the time slot for channel 5. Then, when the time slot for channel 18 is reached, the incoming PCM information word for channel 18 is written into the eighteenth word of memory 110; the eighteenth in memory 111 will be read to obtain the number five to control reading of memory 110; and the data code in the fifth word of memory 110 will be passed to the output bus in the time slot for channel 18. In this way, the information for two connected channels is "swapped". Of course, outgoing information is subsequently converted from PCM form to PAM form and then reconverted into analog form before it is sent via a telephone line to a telephone receiver.

This known "electronic" switching system requires simply that paired numbers be written into the memory 111, or cleared therefrom, to put up and take down connections. Such writing or clearing may occur at time instants which are interleaved between reading of the memory 111 for the purpose of controlling reading of the memory 110, in the fashion indicated above.

With the foregoing as background environment, an exemplary telephone system to embody and practice the apparatus and method of the present invention may now be described with reference to FIGS. 8 through 15. In terms of physical equipment, such a system will include the apparatus herein described with reference to FIGS. 1-4 plus the apparatus shown in FIG. 8 and comprising a suitable iteratively operating computer or microprocessor 112 associated with a memory system 113 which is physically conditioned by an inserted instruction program to form the apparatus and to carry out the methods of the invention. As is well known in the art, the microprocessor 112 includes a clock 114 to provide timing signals and internally includes an instruction address register, an arithmetic-logic unit (ALU), an arithmetic/logic input register, and one or more accumulators together with control circuits to route the signals from one location to another with timing controlled by the clock. An address bus leads to the memory system 113 in order to select, by coded address signals placed on the bus, any particular word of the memory system, the selected word then having signals read from it or written into it via a data bus in response to READ or WRITE signals R or W created by the microprocessor. As a logical program sequence is iteratively executed, signals representing different instructions are read from memory portion 113a into the microprocessor so as to condition the latter to execute a particular type of operation. Usually the instructions will designate that a particular word (at a particular address) in a data memory portion 113b is to be read via the data bus into the microprocessor, a certain operation to be performed with that data word, and the result written back to another designated data word memory location. Because these operations are very familiar to those skilled in the art, further discussion is unnecessary to make fully understandable the organization and operation of the second embodiment of the present invention, although it is necessary that the program of instruction words in the memory portion 113a be described in terms of the sequential operations which they cause and with reference to exemplary data contained at the different word locations within the data memory portion 113b. In this way, one skilled in the art will be able readily to prepare a specific instruction program for insertion into the memory of any computer or microprocessor in order to build and practice the present invention.

For brevity but to provide the framework for understanding a small but exemplary control unit capable of practicing the present invention, it will be assumed that the system to be served includes only forty-eight telephone sets and forty-eight lines. The signals coming from each line are converted into time-sequenced PCM codes (by well known apparatus not shown) at time slots 1–48; and signals going back from the switching network to such lines are sent in time slots 1–48 and reconverted into sinusoidal analog form (by known apparatus, not shown), in the fashion described with reference to FIG. 7. The memory portion 113$b$ of FIG. 8 includes the switching network instruction register 111 illustrated in FIG. 7 to provide the signals which are used to control the information switching memory 110.

Although only forty-eight voice channels are here contemplated, the memories 110 and 111 are illustrated in FIG. 7 as having seventy word slots, scanned or treated sequentially in time, because some extra "connections" need to be established, for example, the signals from an originating line need to be connected and routed to a DTMF detector when that line is carrying DTMF dial tones as a result of the corresponding telephone set being dialed.

Table I (which for convenient reference appears at the end of this specification) reveals the arbitrarily chosen data memory address locations at which various words are stored for accessing and changing by the microprocessor 112 under the control of the program of instructions held in the memory portion 113$a$. In other words, Table I illustrates the layout and the address locations of words held in the data memory portion 113$b$ of FIG. 8. That table will be largely self-explanatory to those of ordinary skill in the art, but a few comments will be helpful, particularly to make clear the acronyms which are used as abbreviations in the flow charts of FIGS. 9–15 discussed below. Referring to Table I, the data word addresses 1–70 are employed to form the connection instruction memory 111 as it is shown in FIG. 7. The seventy words in the latter memory are designated $N_1SLOT$ through $N_{48}SLOT$ and $N'_{49}SLOT$ through $N'_{59}SLOT$ (the remaining addresses 60–70 being unused in the present example). The channels or slot numbers for telephone lines 1–48 are assigned to the data slot addresses 1–48, respectively. In the processing of dialed digit information transmitted over any given line, however, it is necessary for the DTMF tones to be connected to a then-unoccupied tone detector, such detectors being well known to those skilled in the art. In the present simple example, it is assumed that eleven DTMF detectors are provided, so that up to eleven telephone sets may be sending DTMF tones at any given time. The inputs of eleven detectors are assigned to addresses 49–50 in that portion 113$b$ of the data memory shown in FIG. 8 and Table I which forms the switching network "instruction memory". Each DTMF detector may, therefore, receive PCM code signals on a rapidly repeating basis, such signals representing the tones for various ones of the ten digits 0–9. Each DTMF detector, on the other hand, produces four-bit output signals which represent in binary notation the corresponding decimal value of the dial tone then being received. The outputs of these tone detectors are treated as individual words of "read only" memory within the data memory portion 113$b$, as is illustrated in FIG. 8, and they are assigned to address locatins 288–298 as shown in Table I.

The detectors are associated with "register" words of memory at addresses 225–235 and designated in Table I as $REG_1$ through $REG_{11}$. It is assumed for purposes of discussion that the microprocessor 112 and the associated memory 113 are sixteen bits wide; as four successive sets of signals representing four successive dialed digits are produced at the output of a given one of the dial tone detectors, the binary codes representing those four digits may be stored in the respective groups of four bits within a corresponding register word.

Second, it may be noted that several words of the data memory as shown in Table I are employed as "counters" to signal by their numerical contents various address locations. In the symbols employed in Table I, those that end with "CT" designate an address pointer counter which is employed in the scanning of various "lists" of data words. The acronym abbreviations for these counters will be apparent from Table I, for example, the abbreviation LNCT designates "line number counter".

Third, various groups of successively addressed data words are employed as "lists" into which line numbers or network slot numbers may be written or cleared. A first list appears in Table I at addresses 104–114 as an "originating number list" having eleven words designated $ORGN_1$–$ORGN_{11}$. As will become apparent, the counter at address 115 designated ORGCT is employed to scan the originating number list. As explained below when any given line goes into a new off-hook condition to originate a call, the number of that line is inserted into the originating number list.

A second list is designated the "calling number list" and it contains words designated $CGN_1$ through $CGN_{51}$ at addresses 116–166 in the data memory. This list may be scanned by a call list counter CLCT whose numerical signals are contained at address location 218. As noted below, after a given line has originated a call and its number has been inserted into the originating number list, that line will be connected in the switching network to a DTMF detector and register, and its number will be transferred to the calling number list.

A third list is designated in Table I as the "called number list"; it contains words $CDN_1$ through $CDN_{51}$ at address locations 167–217; and it may also be scanned by the call list counter CLCT. After the number of a line which has originated a call has been inserted into the calling number list and dialed digits received to designate the number of the called line, the latter number will be inserted into the called number list.

As noted above, those words at addresses 225–235 are considered to be "registers". They may be scanned by a counter designated REGCT at address 236. When an originating line is about to send DTMF tones as a consequence of dialing, an unoccupied one DTMF detector at one of the addresses 288–298 is connected to that originating line, and the output of that connected detector is then fed through the microprocessor to the corresponding one of the registers at addresses 225–235.

Another list set out in Table I is a "message waiting delay list" which is made up of words $DYLST_1$ through $DYLST_6$ located at addresses 239–245. These words may be scanned by a delay list counter DYCT at address location 246. As will become apparent from the ensuing description, whenever a switchboard operator or console attendant desires to place any particular line into a message waiting status, she may first dial the message waiting access code (here arbitrarily assumed to be 77) and thereafter dial the number for that particular line. The number of that line (which is also its network slot number) will then be inserted into an empty word of the delay list, and it will thereafter be employed to carry out the operations required for the message waiting feature.

A final list is designated as the "Q list" made up of words $Q_1$-$Q_{31}$ located at addresses 247–277. This list may be scanned by a Q counter QCT formed by a word at address 278. As noted below, after a line number or its identical slot number is inserted into the delay list, it will then be automatically transferred to the Q list, and its presence in the Q list will result in the status indicator or lamp of the corresponding telephone set being activated so as to indicate to the user of that set that he has some message waiting.

To enter pairs of multi-bit numerical signals representing lines or channels into the switching instruction memory at addresses 1–70, two switch network words SNWA and SNWB are located at memory locations 280 and 281. The switching instruction memory at addresses 1–70 may be scanned by an instruction register counter IRCT located at address 281, the scanning and writing occurring at instants in time which are interleaved with those instants at which numbers are read from the information memory 111 to control the reading of voice PCM data words from the information memory 110.

Certain sense points which are located in the apparatus of FIGS. 2, 3 and 4 are coupled to the data memory portion 113 of FIG. 8 to form artificial data words. In general, these are words which are only read or only written. In this category, the sense point SP′ in the ring generator of FIG. 4 is designated as a memory word at address location 299, even though it is constituted as a single bit of information which exists at either a binary 0 or 1 level. Nevertheless by addressing and accessing memory location 299, the reading of a 1 or a 0 indicates that the ring generator is then in a two second or a four second interval within given ring cycle, although there is guard banding so that whenever the 0 level is sensed, it is known with complete assurance that the ring generator is in one of its four second intervals.

As explained with reference to FIG. 3, there are forty-eight sense points $SP_1$-$SP_{48}$ associated with respective telephone sets $S_1$ through $S_{48}$. These forty-eight sense points form the respective bits of three 16 bit words designated SPWA, SPWB and SPWC at memory locations 219, 220, 221. By detecting the state of a selected bit within the selected word, the hook status of the corresponding line may be ascertained. It will here be assumed that sense points $SP_1$ through $SP_{16}$ form bits 1 through 16 of word SPWA; sense points $SP_{17}$ through $SP_{32}$ form bits 1 through 16 of word SPWB; and sense points $SP_{33}$ through $SP_{48}$ form bits 1 through 16 of word SPWC. Because it is necessary to detect a change in the hook status of any telephone set, three counterpart words are provided at address locations 222, 223 and 224. These are designated OSPWA, OSPWB, OSPWC because they represent the "old" sense point signals as they existed during an earlier scanning iteration.

Finally, in order to originate or terminate normal ringing (when termination does not occur because of ring trip action), it is necessary to set and reset selectively the several control flip-flops $FFC_1$-$FFC_{48}$ which are illustrated in FIG. 3. The "set" and "reset" terminals S and R of these forty-eight flip-flops are thus constituted as "write only" bits within words of the data memory. As shown in Table I, the forty-eight bits of "set" terminals are designated STFFCA, STFFCB, STFFCC and the forty-eight bits of "reset" terminals are designated as three 16 bit words RSFFCA, RSFFCB, RSFFCC. When a 1 is newly written to and cleared from any bit in these first three words, the corresponding control flip-flop will be switched to its set state; whereas the writing and clearing of a 1 to any bit in the last three words will pulse the corresponding "reset" terminal and result in resetting of the corresponding control flip-flop. As indicated earlier when a control flip-flop is set or reset, its corresponding ring relay K will be picked up or dropped out.

Figure 9:
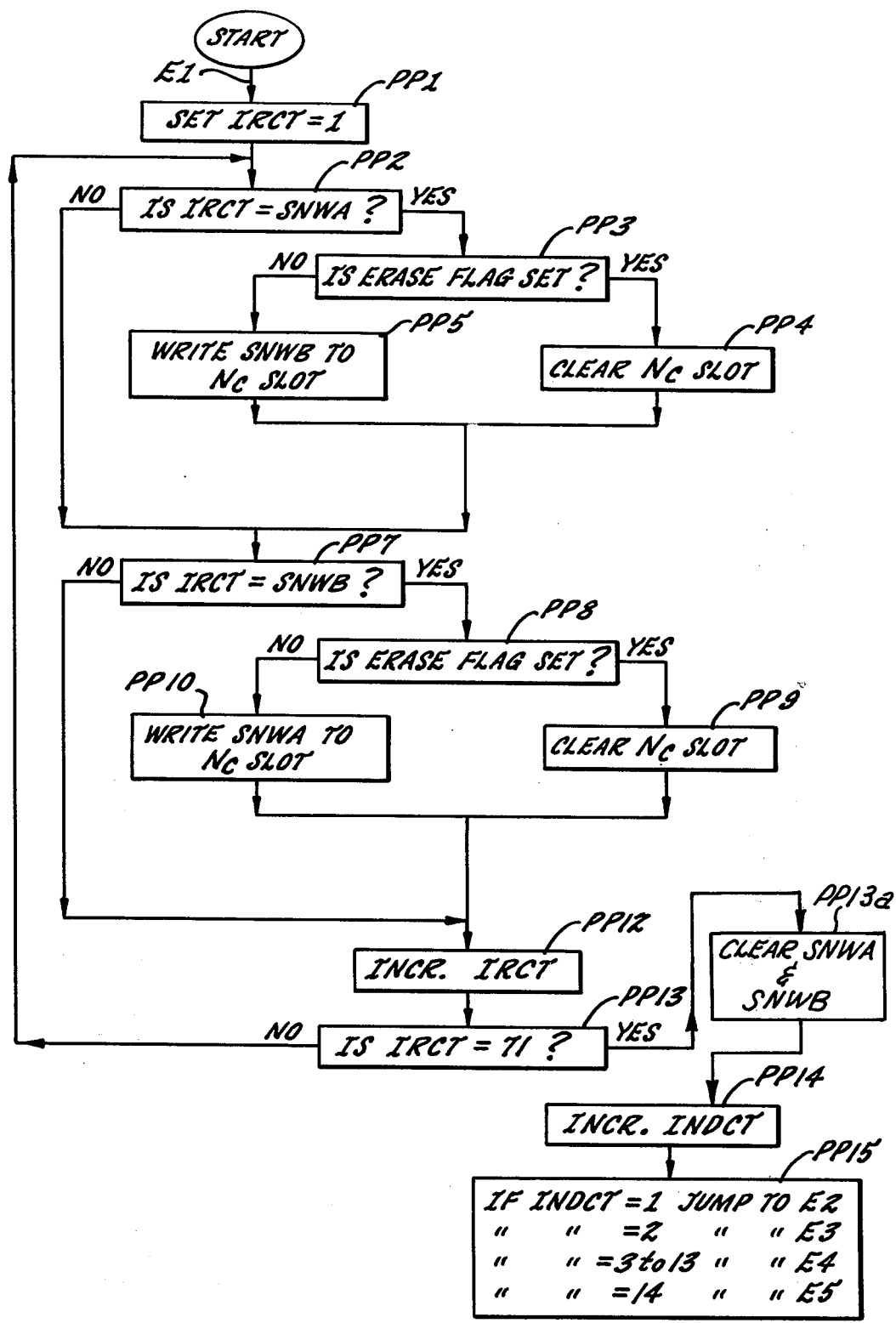
FIG. 9 is a detailed flow chart for a subroutine by which "connection" words are inserted into or removed from a switching network information register or memory.

With the foregoing in mind, a concrete example of the instruction program stored at memory portion 113a, to form apparatus embodying the invention and to carry out the method thereof, may now be described in terms fully understandable to one skilled in the art by reference to the flow charts set out in FIGS. 9 through 15. Referring first to FIG. 9, it should be stated by way of introduction that when a calling line $L_x$ is answered by a called line $L_y$ after dialing by the former and answering by the latter, the two lines or slot numbers therefor are written into memory words SNWA and SNWB; when the two connected lines have completed and terminated a call and go on-hook, the same numbers are so written accompanied by previous setting of an ERASE flag. The manner in which this is accomplished will be explained later but by repeated entry into the sub-routine shown by FIG. 9, a response is made to any new pair of slot numbers which have been written into SNWA and SNWB.

The sub-routine of FIG. 9 is entered at entry address point E1 and a counter IRCT is initialized or set to a numerical value of 1. The counter is used as an address pointer for the network instruction words 1–70 (Table I). Thereafter, the counter word IRCT is incremented one unit at a time up to the value of seventy and after each such incrementing its value is compared with the slot numbers in words SNWA and SNWB. When and if agreement is found with SNWA, the slot number in word SNWB is written to the address signaled by the counter IRCT; and when and if agreement is found with the slot number in SNWB, the number contained in SNWA is written to the address then signaled by IRCT. If an ERASE flag is set, however, then instead of writing numerical values to slot addresses, the words at such addresses are simply cleared.

Considered in greater detail, the program portion PP1 reflects an instruction by which the address pointer counter IRCT is initially set to 1, while the program portion PP2 designates a comparison between the numbers respectively then held at IRCT and SNWA. If those two numbers are not equal, there is a jump to program portion PP7. But if equality is found at PP2, then program portion PP3 is performed to test whether or not the ERASE flag is set. If that flag is not set, there is progression to program portion PP5 where the number contained in SNWB is written to the $N_c$SLOT. The small c as a subscript designates that the writing (or reading in other cases) occurs to an address in the data memory which numerically agrees with the number then signaled by the controlling address pointer counter, in this instance IRCT. Thus, if word SNWA contains a numerical value of five, and the word SNWB contains a numerical value of eighteen, when the program counter IRCT is incremented to signal the value five, program portion PP5 will result in the numerical value of eighteen being written from SNWB to the memory address 5 ($N_5$ slot) in the instruction register constituted by address locations 1 through 70.

On the other hand, if the ERASE flag had been found at PP3 to be set, then the progression would have been through program portion PP4 at which the word corresponding in address to the numbers signaled by IRCT would have been cleared or set to a value of 0. In either case, the operation proceeds to program portion PP7 to perform a comparison of IRCT with the contents of SNWB. If they are unequal, then a jump occurs to PP12; but if equality is found, then the ERASE flag is tested at PP8. If the ERASE flag is not set, then program portion PP10 is performed to write the contents of SNWA to the address which is numerically signaled by IRCT. If we assume again that SNWB contains the numerical value of eighteen, then when the counter IRCT signals eighteen, the assumed value of five in SNWA will be written to the address 18 ($N_{18}$ slot) in the data memory. If the ERASE flag had been set, then PP9 would result in clearing (setting to zero) the number in the memory word at address 18. In either case, the operation proceeds to PP12 by which the counter IRCT is "incremented", i.e., increased by one unit. At the next program portion PP13, the value signaled by IRCT is compared with a fixed number (here, 71) representing one more than the highest numbered address in the list of slot number locations which is to be scanned. If IRCT has not been incremented successively from its starting value of 1 to an ending value of 71, then the sub-routine loops back to PP2 and repeats with the number at IRCT now having been increased by one. After such repeated looping, the comparison made at PP13 ultimately will find equality, and thus the operation will proceed first to PP13a for clearing of the paired words SNWA and SNWB, and next to PP14 where an index counter INDC is incremented. The index counter initially starts in a cleared or a zero condition and after the first incrementing at PP14 it will signal a value of 1. At program steps designated PP15, the index counter INDCT is compared successively with the values 1 through 12. Depending upon the value signaled by INDCT, the overall instruction program for the microprocessor 112 of FIG. 8 jumps to entry points E2, E3, E4 or E5 for sub-routines which are respectively here illustrated in FIGS. 10, 12, 13 and 15.

As will become apparent, the sub-routine illustrated in FIG. 9 will be entered and executed on a very rapidly repeating schedule, so that whenever any new pair of network or line slot numbers are entered into the memory words SNWA and SNWB, they are promptly cross written into the proper address locations of the switching network instruction register constituted by address locations 1-70.

It will therefore be understood that connections are selectively established in the "switching network" information memory 110 shown in FIG. 7. And, when any connection is to be taken down or discontinued, if the paired network slot numbers of two connected lines are written into SNWA and SNWB accompanied by a previous setting of the ERASE flag, then the corresponding words at the network slot addresses will be cleared or set to zero.

Figure 10:
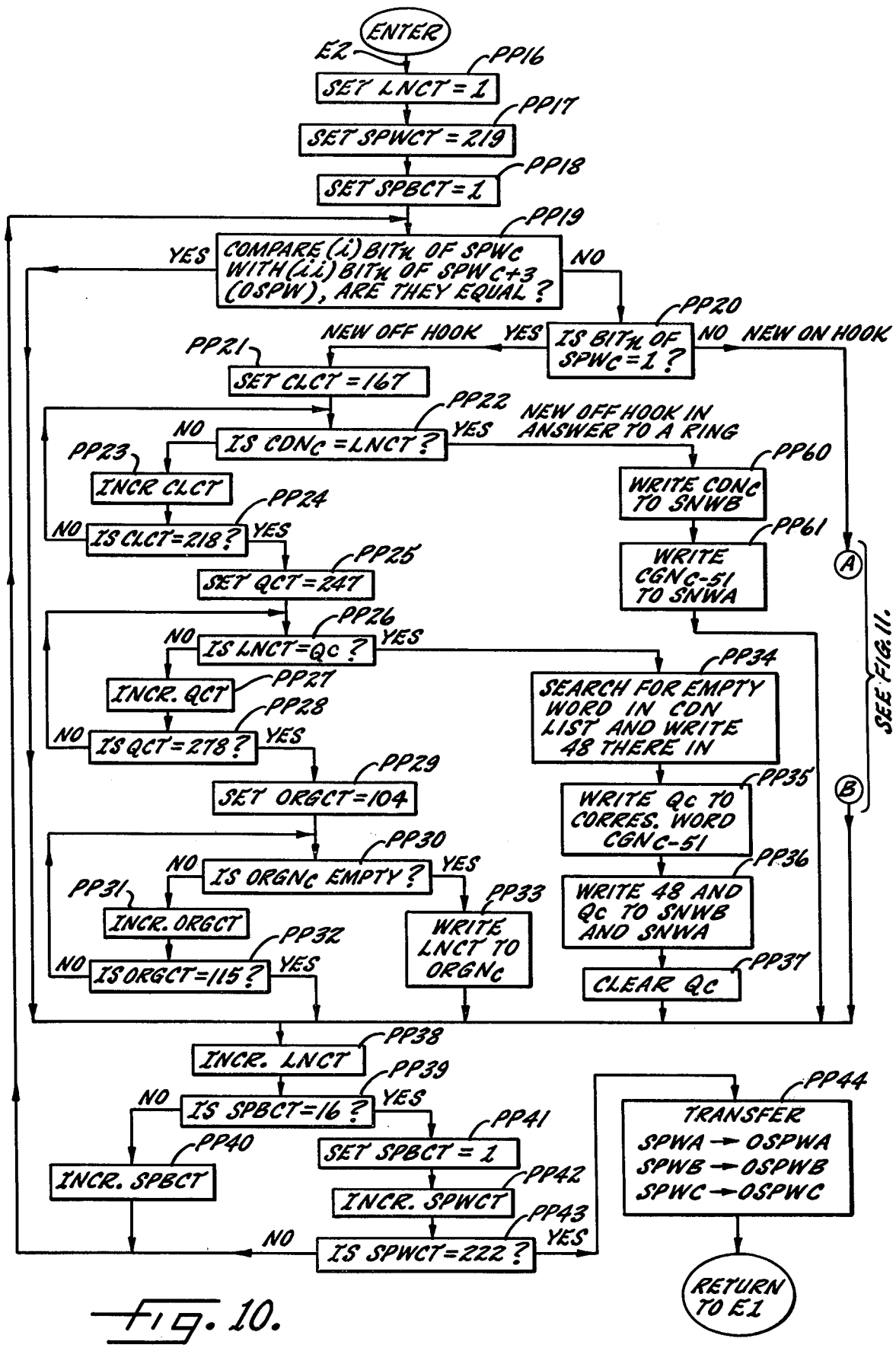
FIG. 10 is a detailed flow chart which generally indicates operations carried out in response to changes in the hook status of various ones of the telephones being served.

Assuming that after a given pass through the sub-routine of FIG. 9 the index counter INDCT is incremented to a count state of 1 during program portion PP14, then PP15 will result in a jump to the entry point E2 for a sub-routine illustrated by FIG. 10. The latter sub-routine is intended to carry out the functions of sensing changes in the hook status of the plurality of telephone sets S1-S48 here being controlled, and to perform initial operations responsive to such changes. It will be recalled that there are forty-eight sense points $SP_1$-$SP_{48}$ which respectively indicate, by the logic level of voltages thereon, hook conditions of the forty-eight telephone sets. At any point in time a given telephone may change from an on-hook to an off-hook condition or vice-versa. The sense points themselves form the bits of the three 16 bit words SPWA, SPWB and SPWC, so that to detect any change in any sense point these forty-eight sense points are scanned in succession. A line counter LNCT is employed to count each sense point during the scan and thus numerically signals the line being tested, while a word counter SPWCT is used to advance the testing from one word to the next. A bit counter SPBCT is used to instruct the microprocessor 112 as to the particular bit which is to be tested within one word.

FIG. 10 shows that the hook-condition sub-routine begins with program portions PP16, PP17, PP18 during which the three respective counters LNCT, SPWCT and SPBCT are respectively initialized at values of 1, 219, and 1. The initial value of 219 represents the lowest-numbered address for the three sense point words SPWA, SPWB, SPWC (see Table I). Thereafter, at program portion PP19, a program instruction pulled from the instruction memory 113a causes the microprocessor 112 (FIG. 8) to compare $BIT_n$ of word $SPW_c$ with $BIT_n$ of word $SPW_{c+3}$. The particular bit n in those two words is that which corresponds to the numerical value signaled by the bit counter SPBCT, and the particular one of the three sense point words which is examined is that whose address corresponds to the count state of the counter SPWCT. It will be seen, therefore, that when the counter SPWCT holds 219 and the bit counter SPBCT holds a five, the fifth bit of word SPWA will be compared with the fifth bit of the "old" sense point word OSPWA whose address is numerically three higher than the address of SPWA. As the forty-eight bits in the three pairs of sense point words are individually compared by incrementing of the counters (such incrementing being explained below) the operations illustrated at PP19 result in an indication as to whether the sense point signal for each of the forty-eight telephone sets here being controlled has changed since the previous pass through FIG. 10 sub-routine. If a pair of compared bits are equal, then a "yes" response is obtained at PP19 to indicate that there has been no change in the hook status of the telephone set whose line number is then signaled by LNCT. On the other hand, if the comparison at PP19 indicates that the two compared bits are unequal, this indicates that there has been a change in the hook status of that particular telephone set. In the former case, there is a jump from program portion PP19 to PP38, but in the latter case the operation proceeds to the instructions at PP20 where the selected bit of the "new" sense point word is tested to determine if it is at a 1 or a 0 level. If that bit is found to be a 1, and remembering that its value has changed since it was previously examined, it is known that the corresponding telephone set (whose line number is signaled at LNCT) is one representing a "new off-hook". Thus, if a "yes" response is obtained at PP20, the operation progresses to PP21 but if a "no" response is received, it is known that the telephone set has a "new on-hook" status whereupon progression is made from PP20 to program steps illustrated between points A and B in FIG. 11 and which will be described later.

Assuming that the sense point being examined has resulted in an indication of a "new off-hook", then program steps PP21 through PP24 are performed in a loop to compare the numbers contained in a called number list CDN with the line number of the sense point being examined, such line number being then signaled by LNCT. The program steps P21-P24 represent a typical sequence for "scanning and comparing" a given list of memory words with a particular value, and such sequences will be referred to at several places in the description which follows. Thus, a description of this particular sequence will serve as an example applicable to all similar sequences. This "scanning and comparing" sequence begins with step PP21 where an address pointing counter CLCT is initialized at a value of 167. From Table I, it will be seen that 167 is the lowest-numbered address for words $CDN_1$ through $CDN_{51}$ which constitute a called number list. As explained below, whenever a particular line is called by dialing from an originating line, the line number of the called line is inserted into the called number list. Thus, as the counter CLCT is progressively incremented, its contents will represent the addresses of successive ones of the words in the called number list, and when that counter reaches a value of 218, it is known that all fifty-one words in the list have been examined. Thus, after initialization of CLCT to a value of 167 at PP21, program portion PP22 causes the microprocessor 112 (FIG. 8) to compare the value of a particular word in the called number list with the value then signaled by the counter LNCT. That particular word is $CDN_c$ where the subscript indicates that the address of the word is numerically the same as the number signaled by the counter CLCT. The data word whose address is signaled by CLCT is pulled from memory into the microprocessor and compared with the contents of the counter word LNCT at address 101. If the two are equal, an affirmative response is obtained, thereby indicating that the new off-hook status previously detected has occurred in answer to an incoming call or ring because, as noted above, when dialed digits from an originating line represent a particular called line the number of that line is inserted into the CDN list. Such an affirmative response results in branching to the program portions PP60 and PP61 and hereinafter described. Assuming a negative response at PP22, the counter CLCT is incremented at PP23 and at PP24 its contents are compared against the fixed value of 218. If a negative response is obtained at PP24, it is known that all of the words in the called number list have not been scanned and thus the program executes a minor loop to reenter at PP22. The step of comparing $CDN_c$ with LNCT is repeated, with the value of CLCT having been increased by one. Another negative response will result in incrementing of CLCT, a comparison at PP24 producing another negative response and the minor loop being executed again. This progressive looping and incrementing of CLCT will continue until an affirmative response is obtained at either PP22 or at PP24, the latter indicating that the particular line number signaled by the counter LNCT does not exist in the called number list CDN. Thus, an affirmative response at PP24 is an indication that the new off-hook condition which has been detected at PP20 is not at telephone set which then either is about to receive an incoming call or is connected through the switching network to another line. In other words, an affirmative response at PP24 is an indication that the line whose number is signaled by LNCT has gone off the hook is a "new origination".

In the subsequent program portions PP25 through PP28, the Q list is scanned in order to determine if the line number signaled by the counter LNCT is in the message waiting status. As hereinafter explained, when any particular telephone set is placed in a message waiting status, its line number, i.e., its network slot number, will be inserted into one of the Q list words having addresses of 247 through 277 (Table I). To carry out certain aspects of the present invention, it is desirable to know whether or not a telephone set which is newly off-hook is in a message waiting status. If so, then that phone set will be connected automatically by a direct call connection procedure to a predetermined line number at which is located a recorded voice playback unit. On the other hand, if it is found that the telephone set which is newly off-hook is not in the Q list, it is known that the new off-hook condition is an ordinary call origination and operations can proceed to process the ordinary call in the ordinary way. Thus, it may here be stated briefly that program steps PP25-PP28 collectively constitute a "scan and compare" sequence by which the line number signals at LNCT is compared with each Q list word. If any Q list word is found equal to LNCT, the operation will skip to program portion PP34 to be described below. But if the comparison sequence results in a finding that the line number signaled at LNCT is not in the Q list, then an affirmative response at program portion PP28 (indicating the new origination is the start of an ordinary call) results in progression to another "scan and compare" sequence at PP29-PP32.

When an ordinary new off-hook condition arises, the line number of the originating telephone set is to be inserted at an available empty space in the origination list ORGN formed by words $ORGN_1$ through $ORGN_{11}$ at addresses 104-114 (Table I). To accomplish this insertion, the originating list is scanned to find the first available empty word, and the number of the originating telephone set, represented by LNCT is inserted into that empty location. Thus, at program portion PP29, an address pointer ORGCT is initially set to a value of 104. Thereafter at program step PP30, the data in the word $ORGN_c$ (namely, the origination list word whose address corresponds to the counter contents ORGCT) is taken into the microprocessor and tested to see if it has a zero value. A negative response results in progression to program portion PP31 where the counter ORGCT is incremented, and thereafter at PP32 the counter is tested against a fixed value of 115 which is one unit higher than the highest address 114 for the origination list words. If the counter has not yet been incremented to a value of 115, the sequence loops back to PP30 and repeats, such repetition occurring until an affirmative response is obtained either at PP30 or PP32. Generally speaking, in a telephone system having only forty-eight sets, it may be expected that fewer than eleven will have new-hook originations and uncompleted calls at any given time. Thus, with reasonable certainty the scanning sequence at PP29-PP32 will find an empty word in the origination list and an affirmative response will be obtained at PP30 so that the operation will branch to PP33. At the latter program portion, the line number from LNCT is written into the address location $ORGN_c$ where that address is represented by the then-signaled value of the counter ORGCT.

Following PP33, the system will jump to PP38 where the line counter LNCT will be incremented. Thereafter at PP39, the contents of the bit counter SPBCP will be compared with the fixed number 16 (the number of bits in a given word). Assuming that the bit counter has at this point in time not been incremented up to a value of sixteen, the program portion PP40 will be executed to increment the bit counter and the operation will return to PP19 to repeat the sub-routine (with LCNC having been increased by 1).

As described thus far the program steps of FIG. 10 deal with a situation where a hook change in a given line was detected, and such change was identified as a new off-hook condition. If the comparison at PP19 indicates no change in hook status, however, then a jump will occur from PP19 to PP38 so that the line counter LNCT will be incremented and the bit counter SPBCT will ordinarily be incremented at PP40. Thus, repeated passes through the sub-routine of FIG. 10 will be the normal situation if no change in hook status of successive lines is detected or only ordinary new hook originations are detected. When the line counter has been incremented up to a count of sixteen, the bit counter SPBCT will also have reached sixteen so that at step PP39 an affirmative response will result in branching to PP41 where the bit counter SPBCT will be reset to an initial value of 1 following which the sense point word counter SPWCT will be incremented at PP42. The following sixteen loops through the sub-routine will therefore deal with the successive sixteen bits in the sense point words SPWB and OSPWB. Such sequences will continue until the bit counter SPBCT again reaches a value of sixteen after which the word counter SPWCT will be incremented to a value of 221, and the bits of the words SPWC and OSPWC will thereafter be sequentially compared. When the word counter SPWCT reaches the value of 222 (and LNCT has reached 48), this is detected at PP43 to indicate that all forty-eight sense points have been examined to determine whether there has been a change in hook status. Operations then proceed to PP44. At the latter program portion the contents of the words SPWA, SPWB, SPWC are transferred to the "old" word locations OSPWA, OSPWB and OSPWC. It is this transfer which results in new values of sense point signals being compared with old values of sense point signals to detect the occurrence and the nature of a hook change which may occur at any time.

Returning attention to PP22, an affirmative answer there indicates that the "new off-hook" condition for the line number signaled by LNCT has resulted from answering a ring (because the same line number is in the called list CDN). This produces a jump to program portions PP60 and PP61 so that the answering line number (then held at $CDN_c$) will be written to SNWB and the calling line number (then held at $CGN_{c-51}$) will be written to SNWA. This will cause the execution of sequences of FIG. 10 to establish a network connection from the calling number to the called and answering number.

Figure 11:
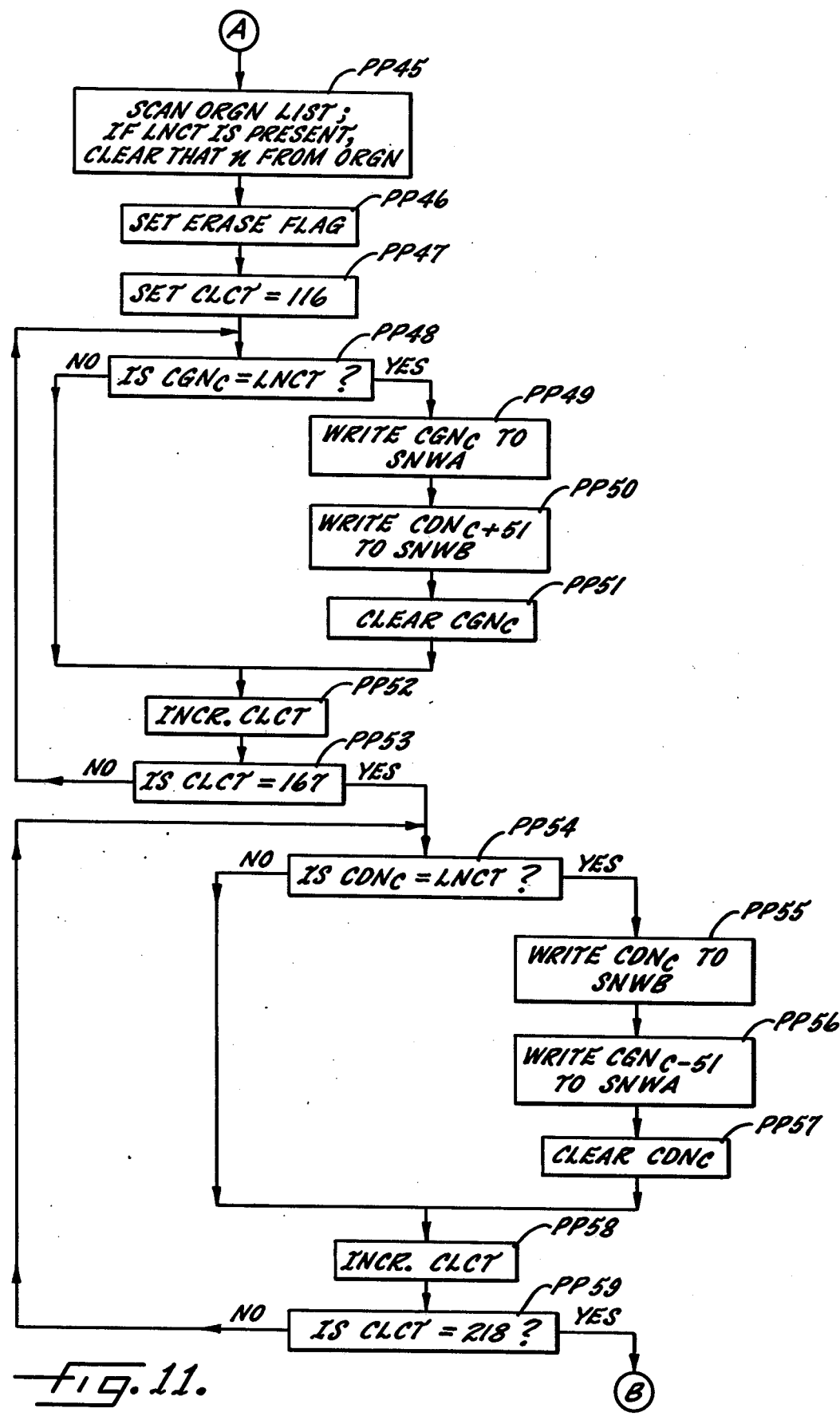
FIG. 11 is a flow chart representation of certain portions of the subroutine set out in FIG. 10.

The program portions PP34–PP37 shown in FIG. 10 will be described below. As noted above, however, a negative response from the comparison performed at PP20 is indicative that a telephone set (whose line number is signaled by LNCT) is in a "new on-hook" condition. That response results in transfer to the program steps between points A and B shown in FIG. 11 and which serve generally to take down call connections which may have been previously established in the switching network. Referring to FIG. 11, point A leads to program portion PP45 during which the origination list ORGN is scanned and compared with LNCT. This "scanning and comparing" sequence is similar to that described above with reference to program steps PP21 through PP24, and involves initializing the counter ORGCT at the originating list initial address 104, followed by incrementing of that counter so that each word in the originating address is tested to see if it contains the number held at LNCT, in which event that word is simply cleared. Thus, if a line which has exhibited a new origination should subsequently go back on-hook, its line number will be removed from the origination list after having been previously inserted at program portion PP33 in a previous pass through the sub-routine.

At program portion PP46, the ERASE flag is set in order to condition the system to take down a previously-established connection as a response to the detection of a new on-hook condition. Thereafter, at program step PP47 the calling list counter CLCT is initialized at a fixed value of 116 (representing the lowest-numbered address for a calling number list of words $CGN_1$ through $CGN_{51}$ at memory addresses 116 through 166—Table I). Then a "scan and compare" sequence is performed at program steps PP48 through PP53, the value contained at a word whose address is signaled by CLCT being compared with the line counter LNCT as counter CLCT is successively incremented to higher values up to 167 (one higher than the highest address in the calling number list). If inequality is found during any pass through this comparison sequence, no result is produced and the counter CLCT is simply incremented at PP52. When, however, a line number in the calling number list CGN is found to equal the line number signaled by LNCT, program portions PP49–PP51 are executed, the first of these being simply to write the number so found in the calling number list (and whose address is represented by the counter CLCT) to the switching network word SNWA. Thereafter at PP50, an address is derived which is equal to the contents of CLCT + 51, and this is used to write the contents from that address in the called number list CDN to the switching network word SNWB. As explained below, when line numbers are written into the called and calling number lists, they are always written in pairs to addresses which are numerically separated by 51. By writing these paired numbers to SWNA and SWNB at program steps PP49, PP50 together with the setting of the ERASE flag at PP46, the system is conditioned to clear the corresponding numbers from the network instruction memory held at address locations 1–70 when the sub-routine of FIG. 9 is next executed.

After all the words of the calling list CGN have been so scanned and treated at PP47–PP53, then a similar scanning sequence is performed at program steps PP54–PP59 except with reference to the called number list CDN. This second scanning is partially redundant, but it too will result in writing to SNWB and SNWA paired words in the calling and called number lists if it is detected that one of the words in the called number list agrees with the line counter LNCT whose signaled value represents the line of a telephone set which has just gone on-hook. Thus, any call connection which has been established in the switching network between two numbers will be taken down by the sequence of program steps illustrated between A and B in FIG. 11, and after the last such step, the sub-routine of FIG. 10 will be joined at program portion PP38.

Once the sub-routine of FIG. 10 has been fully executed to determine new on-hook or new off-hook conditions for the plurality of telephones being served, and after the final transferring steps at program portion PP44, the master program held in memory portion 113a (FIG. 8) returns to execute another pass through the sub-routine of FIG. 9, reentering the latter at E1 and exiting after execution of the program portion PP15. After this second pass through the FIG. 9 sub-routine, the index counter INDCT will be incremented to a value of two, and the program will therefore jump to entry point E3 for the sub-routine set out in FIG. 12. The latter figure illustrates the manner in which new originations are treated so that the system may respond to DTMF signals created by dialing at any new origination line.

Figure 12:
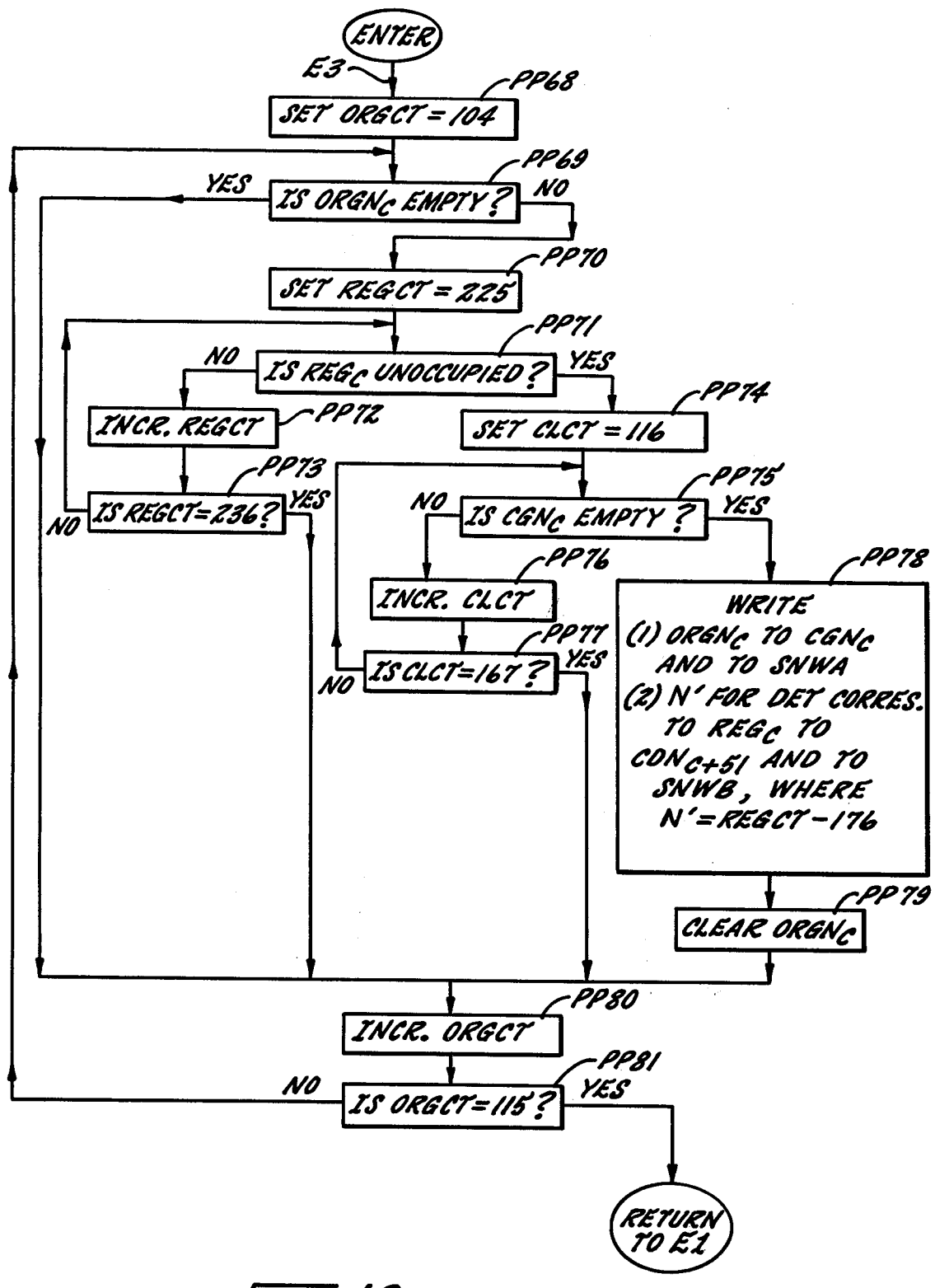
FIG. 12 is a flow chart designating the instructions and the resulting operations for assigning an unoccupied DTMF detector and register to receive dialed tone digits from a line which exhibits a new origination.

In general terms, the sub-routine of FIG. 12 involves scanning of the origination list ORGN to determine if one or more line numbers designating telephone sets with new originations are present. In the event that such new origination numbers exist, then an unoccupied DTMF detector is seized and connected to the channel of the new origination line so as to receive and respond to dialed digit tones as they are created at the originating line. Thus, the sub-routine of FIG. 12 begins with program portion PP68 by which the origination counter ORGCT is set to the lowest-numbered address of the origination list which is located (Table II) at addresses 104 through 114. At the subsequent program portion PP69, the origination word at the address signaled by the number in the counter ORGCT is examined to determine if it is zero, i.e., to determine if that word location is empty. If it is empty, it holds no number representing a new origination, and thus the operation proceeds to program portion PP80. At the latter, the counter ORGCT is incremented, and the counter number is then examined at PP81 to see if it has reached a value of 115 which would indicate that all of the words in the origination list had been scanned. If that scanning is not complete, then the program loops back to PP69 and repeats. If any examination at PP69 reveals that the examined word of the origination list is not empty, then the operation proceeds to program portion PP70 through PP73 where the registers in the list at addresses 225–235 (Table I) are scanned to find an empty or unoccupied register. For ease of discussion in the present example it is assumed that each of the register words at addresses 225–235 is always associated with a corresponding one of the DTMF detectors whose output signals form words of memory $DET_1$–$DET_{11}$ at addresses 288–298. The inputs to these eleven detectors receive tone signals from an originating line via the switching network (these inputs being respectively designated as $N'_{49}SLOT$ through $N'_{59}SLOT$ at addresses 49 through 59). If a given one of the eleven registers $REG_1$–$REG_{11}$ contains zero, therefore, it is known than no dialed digit has been transferred into that register so that such register and its paired detector are presently unoccupied. Thus, the program portion PP71 is simply a test to determine if the register word whose address is signaled by the counter REGCT is zero. If it is not zero, then operation proceeds to PP72 where the counter REGCT is incremented, and then to PP73 where the counter content is compared to the numerical value 236 (which is one unit higher than the highest address in the register list). If all of the register words have not been scanned, operation returns from PP73 to PP71, but if all of them have been scanned, the operation proceeds from PP73 to PP80.

In the small, exemplary system serving forty-eight telephone lines, it may be expected that no more than eleven telephone sets will be dialing at any one time. Therefore, the operations at PP71 will with virtual certainty find at least one of the eleven registers and its paired DTMF detector unoccupied so that there will be a progression from PP71 to PP74. At program portion PP74, the number of the originating line and the slot number for the selected detector are entered into the calling and called lists CGN and CDN, respectively, inasmuch as a "connection" is to be established therebetween. As indicated at PP74–PP79, this is accomplished by writing the number $ORGN_c$ (from the address signaled by the counter ORGCT) to a vacant location in the CGN list.

At PP74, the call list counter CLCT is initialized to signal 116, the lowest-numbered address in the calling list CGN. Thereafter the program portions PP75–PP77 perform a scanning operation to locate one of the calling list words which is empty. As each such word is examined and found to contain a value other than zero, then CLCT is incremented at PP76 and compared against the value of 167 at PP77. If no agreement is found, the scanning continues by returning to PP75. At some point in such scanning an empty word in the calling list will be detected by an affirmative response at PP75, whereupon the system will jump to program portion PP78. In the latter operations, the line number in the origination list (such line having a new off-hook condition) is written to the calling list CGN at an address then signaled by the counter CLCT; and the same number is written to the switching network word SNWA. This is the significance of the legend "$ORGN_c$ to $CGN_c$ and to SNWA". Further, the detector corresponding to the unoccupied register word found at PP71 (and whose address is signaled by REGCT) is to be treated as a called line, and the calling line is to be connected thereto. From Table I it will be seen that the paired word in the called list $CDN_c$ corresponding to the empty word $CGN_c$ found by scanning the calling list has an address which is greater by fifty-one than the address then being signaled by counter CLCT. Thus, as a second part of the program portion PP78, a slot number N' for the detector corresponding to the selected unoccupied register is written to the called number list at an address represented by the CLCT + 51; and that N' is also written to SNWB. The number N' so written at those two places is computed from the value then signaled by REGCT. A specific example with reference to Table I will make this computation clear. Assume that in the progress through the sub-routine of FIG. 12 the register word $REG_3$ at address 227 has been found empty. Thus, when program portion PP78 is executed the register counter REGCT will be signaling the number 227. The detector word $DET_3$ at address 290 will be used in conjunction with the register $REG_3$ to receive and store dialed digits from the originating line (whose number is now signaled by $ORGN_c$ where the subscript c indicates the number signaled by counter ORGCT). The slot number in the "network" corresponding to the third detector $DET_3$ and the third register $REG_3$ is, by assignment, 51. This is apparent from Table I which designates that slot numbers and slot addresses 49–59 are assigned to the inputs of the eleven DTMF detectors. Thus, when the empty register which has been selected is REG$_3$ and REGCT is signaling the address number 227, it is known that the slot number N' of the corresponding detector DET$_3$ is equal to the register counter number REGCT − 176. That is, 227 − 176 = 51, and 51 is the network slot number N' for the associated detector. This is the significance of the expression "where N' = REGCT − 176" as it appears in the block for PP78 in FIG. 12.

After program portion PP78 has been executed and a pair of slot numbers have been written to SNWA, SNWB, then the next execution of the sub-routine in FIG. 9 will cause the switching network to connect the originating line to the input of the selected and previously unoccupied DTMF detector. Those two slot numbers are also stored respectively as a pair of numbers in addresses separated numerically by 51 within the calling list CGN and the called list CDN.

After PP78, the originating line number is cleared from the ORGN word whose address is then signaled by counter ORGCT, and the operational sequence proceeds to PP80 and PP81 so that any remaining words in the origination list are similarly scanned and treated. After all such origination words have been treated, the sub-routine of FIG. 12 ends with a return to the entry E1 for the sub-routine in FIG. 9, and the latter is executed to establish any new connections which may be required in the switching network. At the end of this third pass through the routine of FIG. 9, the index counter is incremented and thus the steps for the program portion PP15 will lead to a jump to the entry point E4 at the beginning of a sub-routine set out in FIG. 13.

Figure 13:
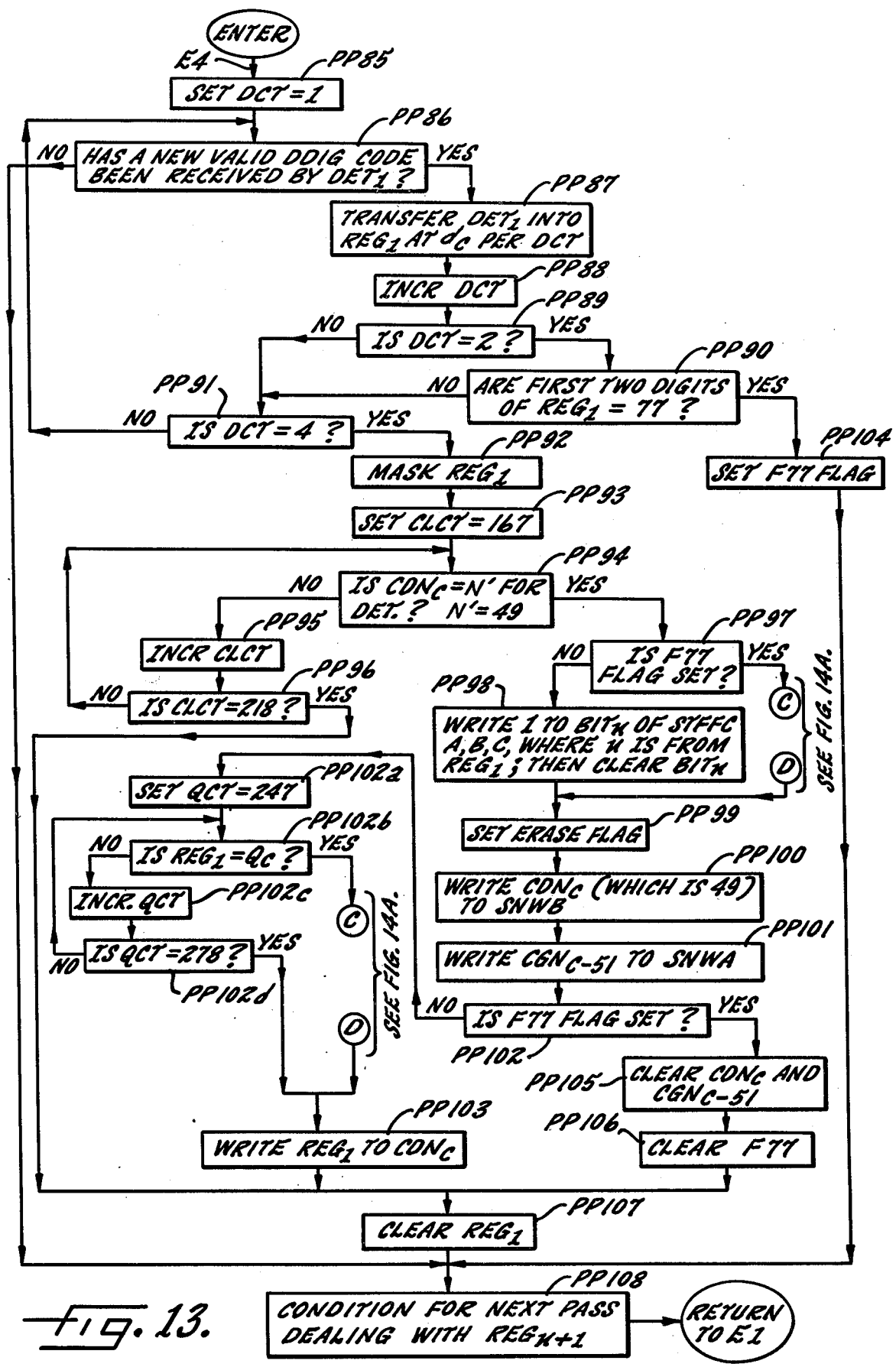
FIG. 13 is a flow chart setting forth in detail the program instruction words for a subroutine which, as a general characterization, responds to and processes signals representing dialed digits as they are received.

The instruction program and the operations which it produces as illustrated in FIG. 13 are designed to handle dialed digit signals produced by an originating telephone set which has been connected (as shown in FIG. 12) to a DTMF detector associated with one of the register words. Moreover, the operational steps which are performed according to the sub-routine of FIG. 13 create a special status indication or signal for setup of a given line in the message waiting status if the access code is dialed by an originating line prior to the dialing of a set of conventional called digits. For purposes of explanation with respect to the small, simple telephone system here being described by way of example, it will be assumed that any originating line dials another line to be reached by a four digit number where the first two digits, in the present case, are superfluous. Thus, it will be assumed that if it is desired to reach any of the lines L$_1$–L$_{48}$ for the sets S$_1$–S$_{48}$, the decimal digits 12xx will be dialed where xx may have any of the numerical values from 01 to 48. Thus, it is the third and fourth digits of the dialed number which really identify the line to be called.

At program portion PP85 in FIG. 13 a digit counter DCT is initialized to hold a value of 1. This counter will be incremented as successive dialed digits are detected so that its signals represent whether the first, second, third or fourth digit of a four-digit dialed number is next to be received. Then, at program portion PP86, the output of the first DTMF detector, which is treated as a memory word DET$_1$, is sensed to determine if a valid four bit signal representing a dialed decimal digit has been received. This detection may include known tests for elapsed time since the previous digit was received, and procedures by which a partially dialed number is erased and aborted if the next received digit occurs too early or too late after the previous one. In any event, if a valid dialed digit code does not exist at the output DET$_1$ when tested at PP86, the operations jump to PP108, bypassing the remainder of the sub-routine in FIG. 13.

Assuming, however, that a valid digit code does exist at DET$_1$, then at program portion PP87 that dialed decimal digit represented as a binary four bit output signal DET$_1$ is transferred into the first one of the register words, i.e., REG$_1$. Since the register words contain sixteen bits and the binary coded representation of any decimal digit 0 to 9 involves only four bits at DET$_1$, this transfer is made to the four-bit group within REG$_1$ which corresponds to the number then signaled by the digit counter DCT. In this way, as the first dialed digit is received it will be transferred into the bit places 1–4 of REG$_1$, as the second dialed digit is received it will be transferred into the bit places B5–8 of REG$_1$, and so on. But after a given dialed digit has been so transferred into REG$_1$ then the digit counter DCT is incremented at PP88. There follows a test at PP89 to determine whether the digit counter is or is not signaling a count of two. If it is not, the program proceeds to portion PP91; if so, the program proceeds to portion PP90. At PP90 the first two digits received in REG$_1$ are examined to determine whether or not they represent the value 77 which is here arbitrarily assumed to be a setup access code for the message waiting feature. Assuming a negative response to the test at PP90, then the operation proceeds to PP91 where a test is made to see if all four digits of a complete dialed number have been received. If DCT is not then 4, it is known that additional digits are to follow, and the operations return to PP86. If a four digit dialed number such as 1228 (calling line 28) has been received, then the operation progresses from PP91 to program portion PP92 where the first two digits of REG$_1$ are masked off so that the remaining two represent the number of the called line. Thus, if the dialed digits 1228 had been received, REG$_1$ is conditioned simply to signal the line number 28. At program steps PP93 through PP96, a scanning and comparing sequence is performed to determine if the slot number for the first DTMF detector is present in the called number list. It will be remembered from FIG. 12 and program portion PP78 that when an originating line has its number temporarily placed in the ORGN list, then an unoccupied detector and register will be selected to receive the subsequently dialed digits from that originating line, and the network slot number N' for the selected detector was then written into the called number list CDN at an address location paired with that of the calling list CGN into which the originating line number is written. Thus, by performing the comparison indicated at PP94 in FIG. 13, it is determined which word (i.e., the address of the word) in the called number list represents the previously established connection between an originating line and detector DET$_1$, if such a connection has been made. If the test at PP94 is negative, then CLCT is incemented at PP95 and tested at PP96 to determine if all of the words in the CDN list have been scanned. If not, operations loop to PP95, and if so, the operations proceed to PP107 because REG$_1$ is found to contain a line number which is not actually being called.

If, however, the test at PP94 is positive — indicating that a particular location CDN$_c$ (whose address is signaled by CLCT) in the called number list contains the slot number for DET$_1$ and the first detector has therefore been connected to an originating line whose number is now stored at a corresponding address in the calling number list CGN—, the operation proceeds to PP97 where the F77 flag is tested. Assuming that flag is not set, then by program portion PP98 a 1 is written to a particular bit which is in the "setting" control words STFFCA, STFFCB and STFFCC. This involves—in the same fashion previously described with reference to FIG. 10 — treating the sixteen bits of those three words as numbered sequentially from 1 through 48 and scanning the bits with the line counter LNCT, word counter SPWCT and bit counter SPBCT to locate and write a 1 at that particular $BIT_n$ which corresponds to the line number then signaled in the register $REG_1$. For example, if line 28 is being called and $REG_1$ holds the number 28, then the twelfth bit of the word STFCB will be set to a 1 value and then cleared — so that a pulse will be sent to the "setting" input terminal of the control flip-flop $FFC_{28}$ associated with line $L_{28}$ (FIG. 3). As explained previously herein, this will cause pickup of the associated ringing relay $K_{28}$ so that the output signal RS from the ring generator 45 (FIGS. 3 and 4) will be applied to $L_{28}$ and the telephone set $S_{28}$ will have its bell sounded for normal ringing (two seconds on and four seconds off). Of course, and as noted above, when the ringing telephone is answered and goes off-hook, the ring trip action will reset the flip-flop and terminate the ringing.

At program portions PP99, 100 and 101, the switching network is conditioned to take down the previously established connection between an originating line and the first detector, inasmuch as dialing has been completed and ringing has been initiated. At program portion 99 the ERASE flag is set; thereafter at PP100 the number then held in $CDN_c$ (at the address signaled by CLCT) and which is 49 for the first detector, is written to SNWB. And finally at PP101, the number of the originating line which has just performed the dialing (i.e., in $CGN_{c-51}$ at the address which is signaled by counter CLCT reduced by 51 to locate the paired address for $CDN_c$) is written to SNWA. Once these operations are performed, then when the sub-routine of FIG. 9 is next executed, the switching network will disconnect the originating line from the first detector in preparation for completing the cell connection if and when the called line answers its ring and goes off-hook.

At program portion PP102, the F77 flag is again tested, and assuming a negative result, a "scan and compare" sequence is performed at program portions PP102a–d (for a purpose to be explained later) leading to portion PP103 which causes the contents of $REG_1$ (the called line number) to be written to the called list at $CDN_c$, replacing the contents at the address signaled by the counter CLCT with the dialed number. The calling list CGN continues to hold the number of the originating line at location $CGN_{c-51}$.

The foregoing steps are carried out totally with reference to the first register word $REG_1$ and its associated first detector $DET_1$. After PP103, the step PP107 is performed to clear $REG_1$, and the operation proceeds to program portion PP108 by which the conditions are set up so that the next pass through the FIG. 13 sub-routine will deal with $REG_n$ and $DET_{n+1}$. In other words, if the first pass treats $REG_1$ and $DET_1$, the second pass will perform the same operations, except with respect to $REG_2$ and $DET_2$. It is a simple matter to establish a "pass counter" for counting the eleven passes through the sub-routine of FIG. 13 and to change certain conditions on successive passes so that during each pass a particular one of the registers and its associated detector are involved. After the first and each subsequent pass, the sub-routine of FIG. 13 exits to entry point E1 of FIG. 9 so that any changes required in the switching network will be effected. Thus, after any fully dialed number is received, the connection between the calling line and a detector/register will be taken down. As shown as PP15 in FIG. 9, the index counter INDCT will result in eleven passes through the FIG. 13 sub-routine to treat successively the eleven registers $REG_1$–$REG_{11}$.

Figure 14A:
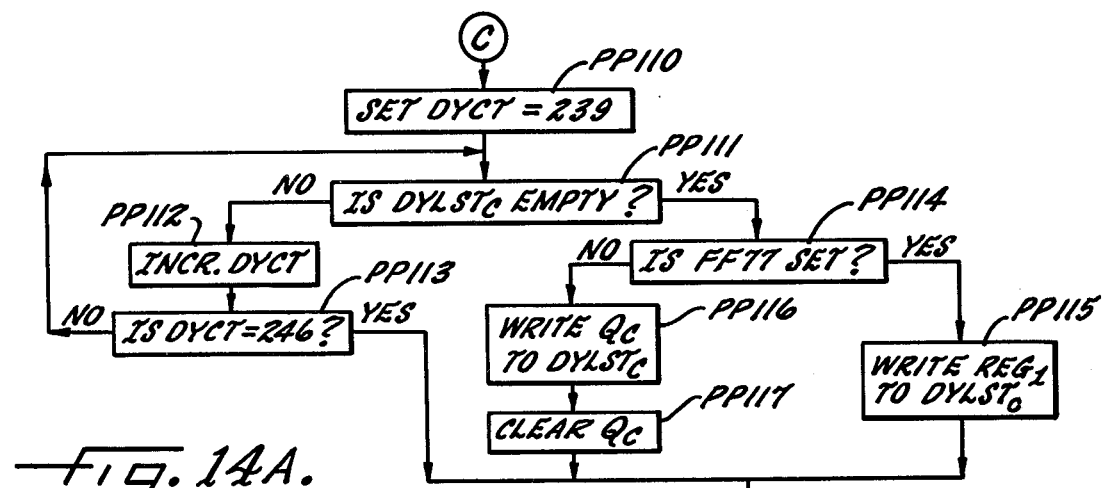
FIGS. 14A and 14B are is a detailed flow charts designating the program instructions and the resulting operations to establish message waiting status signals for different ones of the telephone lines after they have been set up for the message waiting feature.
Figure 14B:
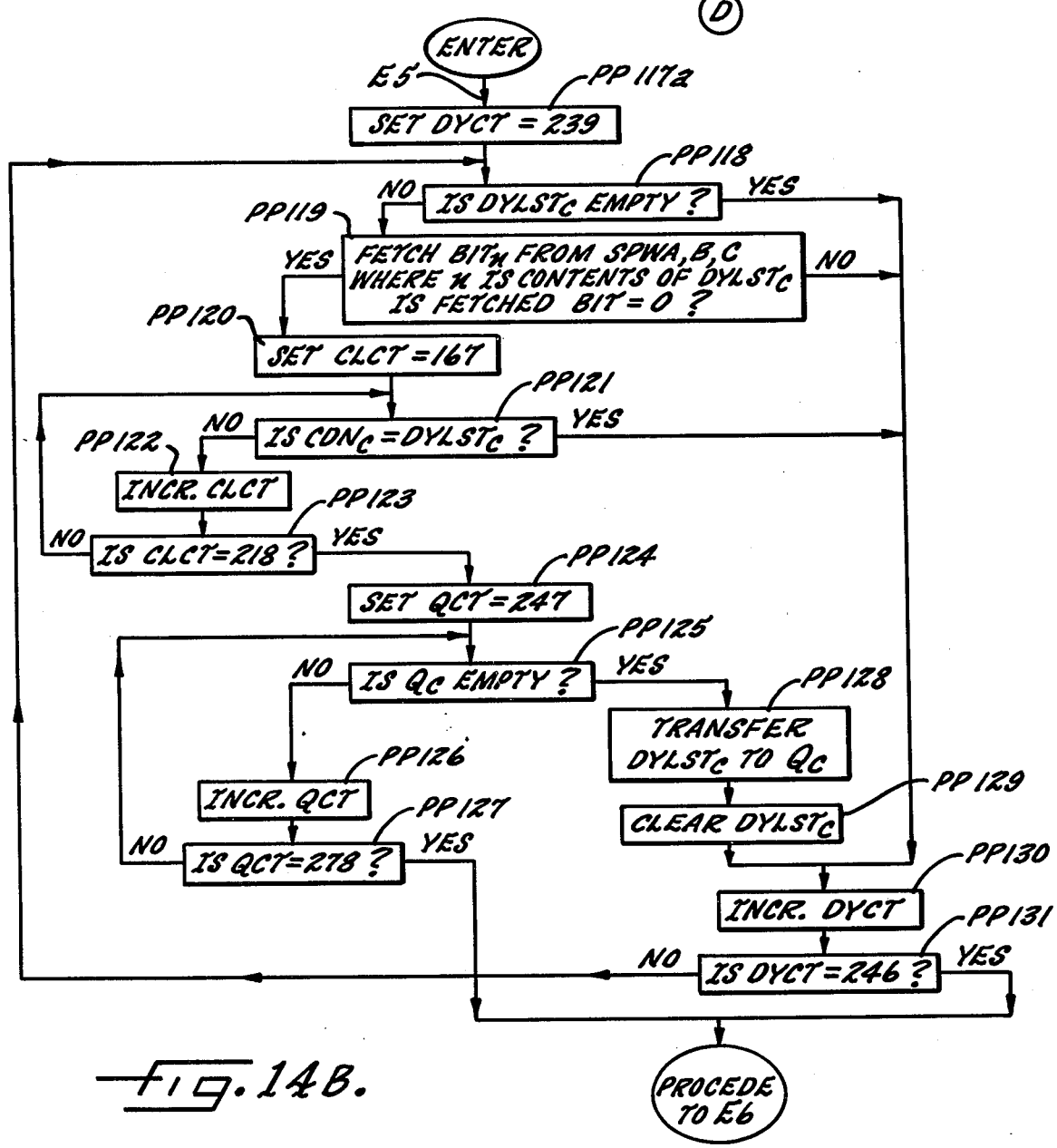

Following all eleven passes through the sub-routine of FIG. 13, with interleaved passes through the sub-routine of FIG. 9, the index counter INDC will have reached a counter state of fourteen, and thus when program portion PP15 shown in FIG. 9 is executed the program of instructions will jump to the entry point E5 for the sub-routine set out in FIG. 14B.

As thus far described, however, it has been assumed that a pass through the sub-routine of FIG. 13 is made when a normally dialed call is being processed in response to four dialed digits previously collected in an available one of the eleven registers $REG_1$–$REG_{11}$. In order to perform setup operations to place any one of the several telephone sets into a "message waiting" status, a switchboard or console operator will first dial a special, predetermined access code (here assumed to be 77) assigned to the message waiting feature, and thereafter dial the number for a line which she desires to place in the message waiting status. When this occurs, a different sequence of operations will result according to the program of instructions illustrated by FIG. 13. The operator or some message center attendant may initiate a normal off-hook origination and then dial the two digit special code 77. The operations in response to that off-hook change, and the selection of a register will proceed as described above with reference to FIGS. 10, 11 and 12. As the sub-routine of FIG. 13 is entered, and assuming that the selected register is $REG_1$, the digit counter DCT will act as above-described and the program portions PP85–PP90 will be carried out in the same fashion. When the second dialed digit is received, however, the comparison made at PP89 will be affirmative, and when the test at PP90 is made to see if the first two digits of $REG_1$ are 77, the response will be affirmative. In this case, the sequence of operations will proceed from PP90 to PP104 where the F77 flag will be set as a designation that the message waiting setup access code has been received. The two digit access code being complete in itself, the system will jump to program portion PP108, i.e., exit from the sub-routine.

After eleven passes through the sub-routine of FIG. 13 have been completed, and a full cycle iteration of the instruction program begins a second time, then when FIG. 13 is entered will reference to the first register $REG_1$, the latter register will still be connected to the attendant's originating line and ready to receive the four-digit number which she will dial to identify the particular line which she desires to place in the message waiting status. As those four dialed digits are detected, the operations which are made clear by program portions PP85 through PP96 will be carried out in the fashion of a normal dialing operation. When the comparison sought at PP94 is found, however, and testing of the flag F77 is performed at PP97, that flag will be found to be set. Thus, the step at PP98 will not be performed and no line will be placed into a ringing condition; instead, there will be a branching to perform the steps labeled C to D (and shown in FIG. 14A) to insert the dialed line number into a "delay list" which holds temporarily those line numbers which are in a message waiting status.

These steps at C to D comprise a "scan and compare" sequence PP110–113 (FIG. 14A) to find an empty word in the delay list $DYLST_1$–$DYLST_n$ using an address pointer counter DYCT. When an empty word is found and signaled by a "yes" response at PP111 (and this will with virtual certainty occur during the scan because enough words are provided in the delay list so that it can be expected never to be full), then the F77 flag is tested at PP114. Since it is in the set state under conditions here being described, program portion PP115 will be executed to write the $REG_1$ contents to the empty location $DYLST_c$ whose address is signaled by DYCT. Thereafter operation proceeds to point D and to PP99 in FIG. 13. Thus, when an attendant or operator "sets up" a given line by dialing 77 and the line number, a message waiting status signal (which is the line number itself) is first created in the delay list of words at addresses 239–245.

Thereafter, the steps PP99–101 (FIG. 13) are carried out and with the same result mentioned above, the switching network words SNWA and SNWB being conditioned so as to take down the previously existing connection between the attendant's originating line and the selected DTMF detector and register. At step PP102 thereafter, the F77 flag will be found set so that the program portion PP103 will not be performed; instead, program portions PP105 and 106 will be executed before PP107 is reached. AT PP105, the paired words in the called number list CDN and the calling number list CGN (and whose addresses are numerically represented by CLCT and CLCT−51) will be cleared so that no vestige of any call or connection will remain after the number of the dialed line has been written into the delay list. In other words, putting a given line into message waiting status does not result in a call to that line.

In review, the instructions which form the sub-routine illustrated in FIG. 13 result in ringing of a line which is dialed from an originating line after the dialed digits have been collected in an available one of the register words $REG_1$ through $REG_{11}$. The existing connection in the switching network between the originating line and a DTMF detector is severed and the calling and called numbers end up as a pair in the CGN and CDN lists so that the system will be ready to establish a connection between the calling line and the called line when the called line answers and goes off-hook. In the event, however, that a two-digit message setup access code 77 is first dialed, the flag F77 is set. Thereafter when a given four digit dialed number is received in the selected register, normal call processing is inhibited by the program steps PP97, and the program steps of FIG. 14A are executed. These result in the dialed number being written into the delay list $DYLST_1$–$DYLST_7$, followed by storage of numbers at SNWB and SNWA to take down later the network connection between the originating line and the selected DTMF detector and register. At PP105, the originating line number is cleared from the CGN list and the selected detector slot number is cleared from the called list CDN. Thus, ringing is initiated (see PP98) when a normal call process occurs by execution of the sub-routine in FIG. 13; but alternatively a message waiting status signal is created for any line whose number is dialed after the 77 code has been dialed.

Figure 15:
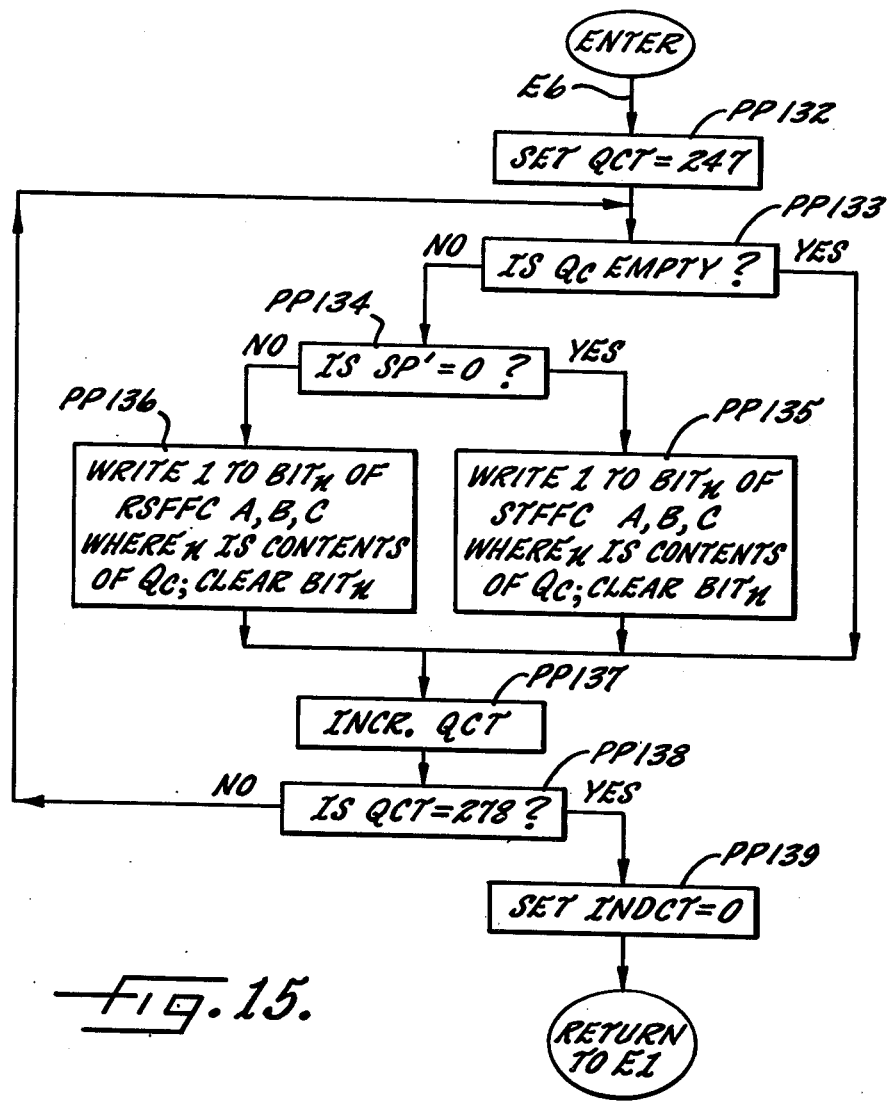
FIG. 15 is a detailed flow chart designating the program instructions and operations by which the status indicator or lamp of any telephone set in the message waiting status is actuated or flashed during the alternate four second intervals measured off by a ring generator.

After each eleven passes through the sub-routine of FIG. 13, the index counter INDCT and the program portion at PP15 in FIG. 9 will result in entry at the point E5 for a sub-routine illustrated by FIGS. 14B and 15. It is the purpose of the instructions illustrated by FIG. 14B to insert any number existing in the delay list into the active Q list. Beginning at step PP117a, the delay list counter DYCT is set to hold 239, the lowest-numbered address in the list of words at addresses 239–245. At program step PP118, the word $DYLST_c$ whose address is signaled by the counter DYCT is pulled from memory and examined to see if it is empty. If the result is affirmative, no further action is required and the operations progress to PP130 where the counter DYCT is incremented. After that at PP131 the counter DYCT is tested to see if it has reached a count state of 246. If not, the operations loop back to PP118 so that the next word at the next address in the delay list is examined to see if it is empty. When PP118 results in a negative answer, then the program portion PP119 causes operations to determine whether or not the telephone line whose number is signaled in the examined delay list word is idle or busy. The program portion PP119 involves the examination, bit by bit, of the forty-eight hook status signals which form the contents of the sense point words SPWA, SPWB, SPWC. This employs the line counter LNCT, a word counter SPWCT, and a bit counter SPBCT for the bit search and comparison procedure which has already been made plain by FIG. 10 discussed above. As an example, if the third word in the DYLST list is found to contain the line number 28 (this designating that line 28 has been placed in a message waiting status), then the operations at program portion 119 will examine the twelfth bit of the word SPWB to see if it has a value of zero. If not, then it is known that that particular line is off-hook and in a busy status, either originating or carrying on a call. But if the tested bit has a zero value and an affirmative response is received at PP119, it is known that the corresponding line is idle and operations progress to program portion PP120 through PP123 where a "scan and compare sequence" is carried out. Each successive word in the called number list CDN is compared against the contents of the delay list word whose address is then signaled by counter DYCT. When the scanning and comparing is completed, an affirmative response will be obtained from program portion PP121 if the line number held in the delay list is being called and therefore exists also in the called number list. In this event, it is known that the message waiting status should not be implemented until some later time when the line number in question ceases to be in an active connection and ceases to be about to receive ringing due to an incoming call. Thus, the progression is from PP121 to PP130 where the DYCT counter is incremented, followed by PP131 where a finding that the complete scanning of the delay list is not over so that the program sequence loops back to PP118.

On the other hand, if the comparison made at PP121 yields a negative response, this is an indication that the line whose number is signaled in the examined word of the delay list is not about to receive an incoming call because that number is not in the called list CDN. Accordingly, the search continues by an incrementing of the counter CLCT at PP122, with a return to PP121 if the comparison at PP123 indicates that the last one of the words in the called list CDN has not yet been examined. When the scanning operation is completed, however, an affirmative response will be received from program portion PP123, so that the system enters another scanning sequence constituted by program portions PP124-127.

Each of the address locations in the Q list is examined to see if it is empty, the objective being to find a vacant word in the Q list into which the line number then held in the examined word of the DYLST list can be inserted. Thus, when an affirmative response is received at PP125, indicating that the Q list word whose address is signaled by the counter QCT is empty, the operation proceeds to program portion PP128 where the number in $DYLST_c$ is transferred to the address location $Q_c$ in the Q list. Thereafter, at PP129 the number is cleared from $DYLST_c$; the DYCT counter is incremented at PP130, and the contents of counter DYCT examined at PP131. If all of the delay list words have been scanned and treated, then the sub-routine of FIG. 14B is finished and the program proceeds to entry point E6 for the remainder of the sub-routine illustrated in FIG. 15.

The operations set out by the flow chart of FIG. 15 are intended to take the signals which designate those particular telephone sets which are in a message waiting status and to cause properly timed application of the ring generator output signal to the corresponding telephone sets so that their lamps will be flashed or visibly excited — thereby to indicate to returning occupants or users of such telephone sets that there is a message waiting. As will be apparent from FIG. 14B, whenever any telephone set or line has been placed in a message waiting status, the Q list will contain the number of that line, such number having been transferred from the delay list provided that the telephone set represented by that number is neither (i) off-hook and busy (see PP119 in FIG. 14) nor (ii) ringing or about to be rung because of the presence of that number in the called number list (see PP121 in FIG. 14).

In general terms, the sub-routine of FIG. 15 involves a scanning of the words in the Q list to identify the various line numbers stored therein. For each line number detected, the corresponding control flip-flop FFC is set at the beginning of each four second interval measured off by the ring generator and it is reset near the end of each such four second interval. This is accomplished by initially setting a counter QCT to the lowest address 247 in the sequence of Q list addresses, as indicated at PP132. Thereafter, at PP133, the contents of the word at the address signaled by the counter QCT are examined to see if they are empty. If so, no further action is required with regard to that particular word of the Q list, and operations jump to program portion PP137. But if a particular examined word in the Q list is not empty (i.e., contains other than zero), a negative response at PP133 leads to program portion 134 where the sense point signal SP' created at the ring generator 45 (FIG. 4) is examined to determine if it is at a 0 or a 1 level. If it is at a 0 level, this indicates that the ring generator output signal is in one of its four second intervals. Because the sub-routine sequences and the entire iteration cycle here described may be repeated with a cycle time, for example, of about 60 milliseconds, it is certain that program step PP135 will be executed no later than such cycle time after the sense point signal SP' (see FIG. 4) switches from a high to a low level shortly after the beginning of the four second "bell silent" intervals. Indeed, the control flip-flop will be redundantly set many times during each four second interval with no ill effect.

The program portion PP135 involves simply the writing of a 1 level signal to that particular one of the forty-eight bits of words STFFCA, STFFCB, STFFCC which corresponds to the line number held in that word of the Q list which is currently being examined. This may be accomplished by well known programming procedures similar to those of FIG. 10 — involving a loop sequence where a counter is incremented successively from 1 through 48. During each of those forty-eight count states of the incremented counter, it is compared with the number N then held in the examined word of the Q list. Simultaneously an address counter points to the successive ones of the forty-eight bits in the three words STFFA, B, C. When the counter and the Q word number agree, a one is written to that particular bit address. This is the significance of the legend which appears in FIG. 15 for PP135, and it will be understood clearly, therefore, that execution of such program portion results in a 1 being written to the set terminal of the control flip-flop FFC associated with the telephone set whose line number is signaled in the examined Q list word. Thereafter, that same bit is cleared so that, in effect, a pulse is supplied to the flip-flop "setting" terminal and the flip-flop is set. Recalling that this picks up the associated ring relay K, it will now be seen that when any number is associated with a message waiting status signal held in the microprocessor memory, the corresponding telephone set will receive on its tip and ring leads the time-spaced voltage pulses P' which appear in the signal RS (FIG. 4A) during spaced four second intervals.

It is necessary, however, that any relay K for a telephone set in the message waiting status be dropped out prior to the beginning of the alternate two second intervals during which a 20 Hz. bell-actuating voltage is present in the ring signal RS — in order to prevent ringing of the bell (except when an incoming call is directed to that phone set). This is accomplished by the program portion PP136 which is executed almost immediately (e.g., less than the cycle time of 60 m.s.) after the sense point signal SP' from the ring generator 45 switches from a low to a high value. That results in a negative response from PP134 so that program portion PP136 is executed. The latter program portion is identical to PP135 except that the writing and clearing of 1 to a particular bit is carried out by use of the "write only" words RSFFCA, B, C so that a pulse is sent to the reset terminal of the control flip-flop which corresponds to the telephone set whose line number is then signaled in the examined word of the Q list.

After either of the program portions PP136 or PP135, the operation proceeds to PP137 where the counter QCT is incremented. Thereafter at PP138, QCT is compared against the fixed value of 278. If equality is lacking, this indicates that the scanning of all of the Q list words has not yet been completed, so operations return to PP133. On the other hand, once all thirty-one of the Q list words have been scanned, an affirmative response at PP138 will lead to program portion 139 where the index counter INDCT will be reset to zero. Thereafter, the instruction program will return to entry point E1 for the sub-routine described above in connection with FIG. 9.

Any line which has been placed in a message waiting status and which has its number signaled in a Q list memory location will have the ring signal RS applied to it, so as to flash the associated lamp, starting at an early instant in each four second interval of the ring signal RS and ending at an instant which precedes the termination of that four second interval. The lamp of each set in a message waiting status will thus be flashed for alternate periods of four seconds and left deactuated for alternate periods of two seconds.

It is to be remembered that when any line is to be rung because an incoming call is directed thereto, the associated control flip-flop FFC and relay K are respectively set and picked up. See PP98 in FIG. 13. Resetting occurs by a ring trip when the ringing phone is answered, or it occurs due to the calling set going back on-hook (FIG. 11). When a line is in message waiting status, however, a reset pulse is applied to its control flip-flop FFC at the end of each four second "bell silent" interval (see PP136 in FIG. 15) and just prior to the start of the two second "bell sounding" intervals. Therefore, if an incoming call were directed to a line whose number is in the Q list (message waiting status), normal ringing of the bell for that line would not be possible due to repeated resetting of the associated control flip-flop.

In the present exemplary embodiment of the invention, that difficulty is avoided by making provision to remove the line number from the Q list, and hold it temporarily in the delay list (so that the associated control flip-flop will not be repeatedly reset), whenever it is found that such line number has been dialed and is about to be rung. Referring to FIG. 13, if normal dialing has resulted in progression down to a negative response at PP102 so that the line number then held in REG$_1$ is about to be called and rung, the "scan and compare" sequence at program portions PP102a–e determines if that line number is in the Q list. If not, an affirmative response obtains at PP102d, and operations proceed to PP103. But if so, an affirmative response will result from the comparison at PP102b, whereupon the program steps of FIG. 14A will be executed prior to PP103. The entry at point C into FIG. 14A, as noted above, involves a "scan and compare" sequence to locate an empty word in the delay list. When it is found and the flag F77 is found not set, then program portion PP111 and PP114 lead to PP116 and 117. The number in the Q list at $Q_c$ (whose address is signaled by QCT, see FIG. 13) is written into the delay list word DYLST$_c$ and the Q list word is cleared.

With that called line number in back in the delay list, its message waiting status is not lost. Now, when the telephone set in message waiting status is placed into a ringing condition (PP98 in FIG. 13), its line number is written into the called number list CDN (see PP103). But after terminating an answered call thereto and and going back on-hook (or if the calling number goes no-hook after a "don't answer"), the line number will be removed from the called number list (PP20 and PP45–59 in FIGS. 10 and 11). When this happens, the program portions PP117a–131 in the sub-routine of FIG. 14B will remove that line number from the delay list and re-insert it into the Q list. Thus, a line in message waiting status may ring in response to, and receive, an incoming call without having its message waiting status signal, or the flashing of its lamp, terminated. It will begin to flash again after the incoming call ends.

In keeping with one advantageous aspect of the present invention, when the user of a telephone in the message waiting status sees or hears the status indicator (e.g., sees the flashing lamp), he will be directly connected to a predetermined line automatically when he lifts the receiver and goes off-hook. The predetermined number may, for example, be that at which a voice recorded message is continuously played back from a tape playback unit, such recorded message directing the user to hang up and then dial a certain specified number to reach a message attendant who will read the waiting message to him from the written call slips which she has before her.

Referring to FIG. 10, it will be recalled that an affirmative response at program portion PP26 will occur when any given set goes newly off-hook at a time when it is not about to receive an incoming call (because its line number is not in the called number list CDN), but only if that line number is in the Q list to indicate that the line has been placed in a message waiting status. Such an affirmative response at PP26 in FIG. 10 will result in a jump to execute program portions PP34–37. At PP34, a search is made through the called number list CDN to locate an empty word therein; and when such empty word is found, the predetermined line number of the tape playback unit is written therein. Assuming by way of example that the playback unit is supplying voice signals continuously to line number 48, the operations carried out at PP34 involve writing the number 48 to the called number list CDN at an address signaled by the counter CLCT used in scanning to locate the originally empty CDN word. Thus, when a line in the message waiting status goes off-hook (and is not answering an incoming call), the system will treat the predetermined number 48 as a line number to be called. Thereafter, at program portion PP35 the line in message waiting status and which is newly off-hook will be treated as if it were a call-originating line. That is, the newly off-hook line number contained in the word $Q_c$ (whose address is then signaled by QCT) will be written into the calling number list at CGN$_{c-51}$ (at the address fifty-one units lower than that signaled by CLCT as a result of its search made in program portion PP34). Thus, a pair of numbers representing a calling number and a called number (with the latter being the predetermined playback unit number) are written into paired address locations of the lists CGN and CDN. Thereafter, at program portion PP36, those same line numbers are written to SNWB and SNWA so that the next pass through the sub-routine of FIG. 9 will establish a connection in the switching network from the newly off-hook line which was in the message waiting status to the recorded message playback unit.

After program portion PP36, the message waiting status line number at $Q_c$ (whose address is then signaled by the counter QCT) is cleared — this being done to erase the previously established message waiting status signal since the user of the telephone set has responded to the indicator or flashing lamp and his telephone no longer needs to be maintained in a message waiting status.

Subsequent to PP37 in FIG. 10, the line counter LNCT is incremented in PP38 in the manner and for the purpose previously described.

In review, the delay list and Q list memory words constitute means for establishing a special (message waiting) status signal for any one or more of the telephone sets. This is done by an operator or attendant dialing an access code 77 and the dial call number of a line to be put into that status — and explained in relation to FIG. 13. The line number is put into the delay list (FIG. 13 at PP97 and FIG. 14A) and then transferred at the earliest opportunity into the Q list (FIG. 14B). With the status signal present, a voltage is applied to the line of the corresponding telephone set to actuate the status indicator (lamp) during those intervals of a recurring cycle which are normally "bell silent" intervals — and this is accomplished by connecting the output of the ring generator 45, constructed to produce the ring signal RS (FIG. 4A), to the telephone line during at least a portion of the alternate four second intervals within the ring signal. No separate source of lamp-flashing voltage is required and no modifications need be made to the line equipment except to the ring generator which serves a plurality of lines.

Once the special status signal has been created for one or more telephone sets, any such set is connected automatically to a predetermined line (e.g., 48), and its special status terminated, when it goes off-hook. See FIG. 10 at PP20-26, and 34-37. The predetermined line may be either one at which a playback unit is supplying recorded voice instructions or an attendant's console or a message center at which a message clerk is located. But a line in the special status, and whose indicator (lamp) is being excited to so inform the user, may receive an incoming call and be rung in a normal fashion without interference because of the message waiting and without losing its message waiting status (see FIG. 10 at PP20-22, 60, 61 and FIG. 13 at PP97-102b taken with FIG. 14A). The status signal is removed temporarily from the Q bit to avoid interference with the normal ringing function, held in the delay list, and then returned to the Q list (FIG. 14B) after the incoming call is over and the line again becomes idle.

The small, exemplary system here described may readily be expanded to serve a much larger number of telephones than the forty-eight here discussed by way of example, and it will be understood that provision may be made in such system for accomplishing other control functions (e.g., generation and switching of dial-ready tones or call conferencing) not here described. Moreover, while the second embodiment has been described with reference to a microprocessor or computer with "lists" of memory words whose contents are line numbers which are scanned, it is within the skill of the known art to instead employ a multi-bit status word of memory for each line number, and to determine whether any line is in an originating, calling, called, connected or special status condition by scanning such status words of memory.

There follows as the terminal portion of this specification the Table I to which reference has been made above and which is here located for convenient reference:

TABLE 1

| ADDRESS | SYMBOL | DESIGNATION | ADDRESS | SYMBOL | DESIGNATION |
|---|---|---|---|---|---|
| 1 | $N_1$SLOT | | 222 | OSPWA | Old Sense Point Words |
| . | . | | 223 | OSPWB | (48 bits) |
| . | . | Line No. Slots | 224 | OSPWC | |
| . | . | | 225 | $REG_1$ | Register Words To Receive Dialed Digits |
| 48 | $N_{48}$SLOT | | . | . | |
| 49 | $N'_{49}$SLOT | Switching Network Instruction Register | 235 | $REG_{11}$ | |
| . | . | DTMF $DET_{1-11}$ Input No. Slots | 236 | REGCT | Register Counter |
| . | . | | 237 | DCT | Digit Counter |
| . | . | | 238 | F77 | M.W. Setup Flag |
| 59 | $N'_{59}$SLOT | | 239 | $DYLST_1$ | Delay List |
| . | | | . | . | |
| . | | | 245 | $DYLST_7$ | |
| 70 | | | 246 | DYCT | Delay List Counter |
| | | | 247 | $Q_1$ | Q List Message Waiting Status Signals |
| 101 | LNCT | Line No. Counter | . | . | |
| 102 | SPWCT | Sense Point Word Counter | 277 | $Q_{31}$ | |
| | | | 278 | OCT | Q List Counter |
| 103 | SPBCT | Sense Point Bit Counter | 279 | SNWA | SW. Net Input Words A & B |
| 104 | $ORGN_1$ | | 280 | SNWB | |
| . | . | Origination List | 281 | IRCT | Instr. Reg. Counter |
| | | | 282 | STFFCA | "Setting" to $FFC_1$-$FFC_{48}$ |
| 114 | $ORGN_{11}$ | | 283 | STFFCB | |
| 115 | ORGCT | Orig. List Counter | 284 | STFFCC | (48 bits) |
| 116 | $CGN_1$ | | 285 | RSFFCA | "Resetting" to $FFC_1$-$FFC_{48}$ |
| . | . | Calling Number List | 286 | RSFFCB | |
| | | | 287 | RSFFCC | (48 bits) |
| 166 | $CGN_{51}$ | | 288 | $DET_1$ | DTMF Detector Outputs (4 bits each) |
| 167 | $CDN_1$ | | . | . | |
| . | . | Called Number List | . | . | |
| . | . | | 298 | $DET_{11}$ | |
| . | . | | 299 | SP' | Ring Gen. Sense Point Index Counter |
| 217 | $CDN_{51}$ | | 300 | INDCT | |
| 218 | CLCT | Call List Counter | 301 | ERASE | Erase Flag |
| 219 | SPWA | Sense Point Words (48 bits) | | | |
| 220 | SPWB | | | | |
| 221 | SPWC | | | | |

We claim:

1. In a system serving a plurality of telephone sets, each set having a bell and an electrically actuatable status indicator connected across its tip and ring leads, said system having a switching network and a control unit therefor and further including (a) a ring generator having means for producing a continuous ring signal which in waveform is made up of alternate first and second intervals of predetermined durations of x and y seconds, with low frequency ac. voltage of sufficient amplitude to actuate a telephone bell being present during said first intervals, (b) selectively actuatable means for applying said ring signal to the tip and ring leads of any one of said telephone sets when such set is to be rung, and said system being characterized by the improvement comprising (1) means for selectively applying to the tip and ring leads of any one of said telephone sets a voltage which is timed to appear during at least a portion of said second intervals and which is sufficient in magnitude and form to excite the status indicator of that set without actuating the bell of that set.

2. In a system serving a plurality of telephone sets, each set having a bell and an electrically actuatable status indicator connected across its tip and ring leads, said system having a switching network and a control unit therefor, the combination comprising (1) a ring generator serving said telephone sets in common, and including
   (a) means for producing a cyclically repeating ring signal which in form is alternate first and second intervals of
      (i) ac. low frequency voltage capable of actuating said bells, and (ii) a voltage capable of actuating said indicators but not said bells, said first and second intervals being of x and y seconds, where x and y are predetermined values, (2) conventional means for applying said cyclically repeating ring signal to the tip and ring leads of any given set when an incoming call is directed to that set, whereby the bell of that set sounds for alternate "on" intervals of x seconds and alternate "off" intervals of y seconds, (3) means in said control unit settable to signal a special status for any one or more of the telephone sets, and (4) means responsive to a special status indication for any given set for applying said ring signal to the tip and ring conductors of that set during at least a portion of each of said second intervals, whereby said status indicator for said given set is actuated during at least a portion said second intervals of y seconds.

3. The combination set forth in claim 2 further characterized in that said means (1)(a) produces said voltage capable of actuating said indicators in the form of dc. voltage pulses spaced apart in time.

4. The combination set forth in claim 3 further characterized in that said status indicator in each of said telephone sets is a lamp which flashes visibly in response to said time-spaced dc. voltage pulses being applied thereto.

5. The combination set forth in claim 2 further characterized in that said means (4) includes means for applying said ring signal to said leads after a short, predetermined delay from the instant that each second interval of y seconds begins and means for removing said ring signal from said conductors at an instant which precedes, by a short predetermined period, the instant at which each of said second intervals ends.

6. The combination set forth in claim 2, wherein said means (2) includes (2a) latching relay means associated with each set and responsive to "set" and "reset" signals for respectively coupling or removing said ring signal to and from the tip and ring conductors of that set, and said means (4) includes, (4a) means, operative only when a special status signal for any given set is present, for supplying a "set" signal to said means (2a) for that given set during each of said second intervals of y seconds, and (4b) means for thereafter supplying a "reset" signal to said means (2a) for that set prior to the end of each such second interval.

7. The combination set forth in claim 2 further including (5) hook detector means associated with each set for producing a hook signal having a 0 or 1 level when that set is on or off hook, and (6) means responsive to said hook signal changing from a 0 to a 1 level for resetting said means (3) to remove any existing special status indication for the corresponding set.

8. The combination set forth in claim 7 further including (7) means also responsive to said hook signal changing from a 0 to a 1 level while said special status indication exists for the corresponding set for effecting an immediate call from the latter set to a predetermined telephone set.

9. The combination set forth in claim 8 further including (8) means to disable said means (6) and (7) if the on-to-off hook signal change occurs while said means (2) are causing conventional ringing of the bell of that set.

10. The combination set forth in claim 2 wherein said means (2) and (4) include a single common switching device associated with each of said sets and selectively actuatable to connect said ring signal to the tip and ring leads of the associated set, said means (2) includes means for actuating the switching device associated with a given set when and so long as that set is to be "rung", and said means (4) includes means for actuating the switching device associated with a given set, for which a special status is signaled by said means (3), during at least a portion of said second intervals.

11. In a method of exciting status indicators, actuatable by a dc. voltage exceeding a predetermined magnitude, in selected ones of a plurality of telephone sets without ringing the bells in such sets, each telephone set having an ac. bell solenoid and an electrically actuatable status indicator connected directly across its tip and ring leads, said indicator being actuated in response to voltage exceeding a predetermined magnitude, said method including the steps of (1) generating a conventional ringing signal which is a recurring sequence of alternate (i) first predetermined intervals of x seconds of low frequency ac. voltage and (ii) second predetermined intervals of y seconds of zero voltage, said ringing signal being switchable for application to the tip and ring conductors of a telephone set to cause alternate x and y second intervals of bell sounding and silence, and (2) applying said ringing signal to the tip and ring leads of any given telephone set which is to be "rung" in response to an incoming call, and said method being characterized by the improvements comprising (3) creating a special status signal for those ones of said telephone sets whose indicators are to be actuated for status signaling, and (4) applying to the tip and ring leads, of the set corresponding to said status signals, a dc. voltage exceeding said predetermined magnitude during at least a portion of the second intervals of y seconds, said applied dc. voltage being suitable for actuating the status indicators of the corresponding sets to produce indications thereby without sounding said bell.

12. The improved method set out in claim 11 further characterized in that said step (4) is carried out by applying a time spaced series of dc. voltage pulses during the second intervals of y seconds.

13. The improved method set out in claim 12 further characterized in that said status indicators are lamps, and actuation thereof by said voltage pulses causes them to flash visibly.

14. The improved method defined in claim 11 wherein said step (4) is performed by applying said dc. voltage after a predetermined delay from the instant that each of said second intervals begins.

15. The method improvement defined in claim 11 wherein said step (4) includes removing said dc. voltage at an instant which precedes the end of each said second intervals.

16. The method set forth in claim 12 wherein said step (4) is performed by initiating said time spaced pulses after a predetermined delay from the instant at which each second interval begins.

17. The method set forth in claim 12 wherein said step (4) is performed by creating the last pulse in each series prior to the instant at which each second interval ends.

18. The method of exciting electrically actuatable status indicators in selected ones of a plurality of telephone sets without ringing the bells in such sets but permitting conventional selective ringing of such bells, each telephone set having an ac. bell solenoid and an electrically actuatable status indicator connected across its tip and ring leads, said method comprising the steps of
 (1) generating a ringing signal which is a recurring sequence of alternate (i) first predetermined intervals of x seconds of low frequency ac. voltage and (ii) second predetermined intervals of y seconds of time spaced voltage pulses, said ringing signal being potentially applicable to the tip and ring leads of a plurality of telephone sets,
 (2) switching said ringing signal onto the conductors of any given telephone set in response to an incoming call directed to that set, whereby the bell of said set is sounded and silent respectively for alternate x and y second intervals,
 (3) creating a special status signal for those ones of said telephone sets whose lamps are to be excited for status signaling, and
 (4) switching said ringing signal onto the conductors of those telephone sets corresponding to said status signals during the second intervals, whereby status indicators in such sets are visibly excited during the second intervals by y seconds but the bells in such sets remain silent.

19. The method set forth in claim 18 and including the steps of
 (5) producing a hook signal for each of said telephone sets and which has a 0 or a 1 level when that set is on-hook or off-hook, and
 (6) removing any existing special status signal for a given telephone set when the hook signal for that set changes from a 0 to 1 level.

20. The method set forth in claim 19 wherein said step (6) is aborted if the hook signal of a given telephone set changes from 0 to 1 at a time when said step (2) is being performed, whereby answering of an incoming call ring at any telephone set does not remove its special status.

21. The method set forth in claim 18 wherein said steps (2) and (4) are effected by controlling a single switching means associated with each telephone set.

22. The method set forth in claim 18 and including the steps of
 (5) producing a hook signal for each of said telephone sets and which has a 0 or a 1 level when that set is on-hook or off-hook, and
 (6) in response to a change from 0 to 1 in the hook signal of any set for which there exists a special status signal, effecting a direct call to a predetermined telephone.

23. A ring generator for use in a telephone system and having
 (1) means for producing a cyclically recurring timing signal having first intervals of x seconds at a 1 level followed by second intervals of y seconds at a 0 level, where x and y are predetermined numbers,
 (2) means controlled by said timing signal when the latter is at its 1 level for supplying to an output terminal a low frequency sinusoidal voltage which in amplitude and frequency is adapted to actuate the bell of a telephone set, said ring generator being characterized by the improvement comprising
 (3) means for supplying to said output terminal, during at least a portion of the intervals when said timing signal is at its 0 level, a voltage which is adapted to activate a special status indicator in a telephone set.

24. The improved combination set forth in claim 23 wherein said means (3) includes means to create said indicator-activating voltage as a series of time-spaced voltage pulses.

25. The improved combination set forth in claim 24 wherein said means (3) includes means to make said voltage pulses of amplitude and width sufficient to excite a special status indicator lamp in a telephone set without actuating the conventional bell in such set.

26. The combination set forth in claim 24, wherein said means (3) includes means for producing the first pulse in each series after a predetermined time delay from the instant at which said timing signal changes from a 1 to a 0 level.

27. The improved combination set forth in claim 23 wherein said means (3) includes means for initiating the indicator-activating voltage subsequent to the instant at which said timing signal switches from a 1 to a 0 level and terminating such voltage prior to the instant that said timing signal switches from a 0 to a 1 level.

28. In a method of exciting electrically actuatable status indicators in selected ones of a plurality of telephone sets without ringing the bells in such sets, each telephone set having an ac. bell solenoid and a status indicator connected directly across its tip and ring leads, said method including the steps of
 (a) generating a continuous ring signal which is a waveform made up of alternate first and second intervals having predetermined durations of x and y seconds, with low frequency ac. voltage of sufficient amplitude to actuate a telephone bell being present during said first intervals,
 (b) selectively switching said ring signal across the tip and ring leads of any one of said telephone sets when that set is to be rung, and said method being characterized by the improvement comprising
 (1) selectively applying across the tip and ring leads of any one of said telephone sets, during at least a portion of said second intervals, a voltage which is sufficient in magnitude and form to actuate the status indicator of that set without actuating the bell of that set.

29. The method of generating a ring signal for use in a telephone system serving a plurality of telephone sets, said method comprising
   (1) producing the ring signal during a first series of separated time intervals x with a voltage having a first form and magnitude sufficient to actuate the bells of telephones, and
   (2) producing the ring signal during a second series of separated time intervals y with a voltage having a second form and magnitude insufficient to actuate bells of telephones but sufficient to actuate special status indicators, said time intervals y being alternately interleaved with said time intervals x.

30. The method set out in claim 29 further including
   (3) applying said ring signal to a telephone set over a span of time which includes several of said x and y intervals, thereby to sound the bell of that set during the included x intervals, and
   (4) applying said ring signal to a telephone set only during at least a portion of said y intervals, thereby to actuate a special status indicator in that set without sounding its bell.

31. The method set out in claim 30 further characterized in that said steps (3) and (4) are carried out by
   (3a) actuating a switching device during said span of time to apply said ring signal to a given telephone set over said span of time, and
   (3b) actuating the same switching device only during at least a portion of said y intervals to apply said ring signal to said given telephone set.

32. The method set out in claim 29 further characterized in that said first form and magnitude voltage is an ac. voltage of frequency and amplitude to actuate an ac. telephone bell, and said second form and magnitude voltage is a dc. voltage.

33. The method set out in claim 32 wherein said dc. voltage is a series of dc. voltage pulses.

34. The method set out in claim 32 wherein said dc. voltage is produced such that it appears subsequent to the beginning of an interval y and disappears prior to the end of the interval y.

* * * * *